US011912487B2

(12) United States Patent
Hagihara

(10) Patent No.: US 11,912,487 B2
(45) Date of Patent: Feb. 27, 2024

(54) BAG-IN BOX

(71) Applicant: Inter Holdings Co., Ltd., Tokyo (JP)

(72) Inventor: Tadashi Hagihara, Mobara (JP)

(73) Assignee: Inter Holdings Co., Ltd., Tokyo (JP)

(*) Notice: Subject to any disclaimer, the term of this patent is extended or adjusted under 35 U.S.C. 154(b) by 1471 days.

(21) Appl. No.: 16/097,554

(22) PCT Filed: Jan. 26, 2017

(86) PCT No.: PCT/JP2017/002797
§ 371 (c)(1),
(2) Date: Oct. 29, 2018

(87) PCT Pub. No.: WO2017/187683
PCT Pub. Date: Nov. 2, 2017

(65) Prior Publication Data

US 2019/0152673 A1 May 23, 2019

(30) Foreign Application Priority Data

Apr. 30, 2016 (JP) ................................ 2016-092188

(51) Int. Cl.
*B65D 77/06* (2006.01)
*B31B 50/26* (2017.01)
*B65D 5/50* (2006.01)

(52) U.S. Cl.
CPC ........... *B65D 77/067* (2013.01); *B31B 50/26* (2017.08); *B65D 5/5035* (2013.01); *B65D 77/06* (2013.01)

(58) Field of Classification Search
CPC .... B65D 77/067; B65D 5/5035; B65D 77/06; B31B 50/26

(Continued)

(56) References Cited

U.S. PATENT DOCUMENTS 3,453,033 A 7/1969 Goss
4,673,125 A 6/1987 Weaver
(Continued)

FOREIGN PATENT DOCUMENTS

FR 2603029 A * 2/1988 ........... B65D 77/062
FR 3041615 A1 * 3/2017 ........... B65D 77/067
(Continued)

OTHER PUBLICATIONS

International Search Report, dated Mar. 21, 2017 (dated Mar. 21, 2017), 2 pages.

*Primary Examiner* — J. Gregory Pickett
*Assistant Examiner* — Niki M Eloshway
(74) *Attorney, Agent, or Firm* — Rankin, Hill & Clark LLP

(57) ABSTRACT

A bag-in box includes a storage box provided with a through hole of a pouring nozzle opening and closing mechanism at a lower side wall; and a suspension container suspended in the storage box. A bottom portion of the storage box is provided with a base for holding the suspension container inclined toward the through hole. An upper portion of the storage box is provided with a suspension unit for suspending an opening and closing plug provided at an upper portion of the suspension container. The opening and closing plug is opened when filling a liquid content. When pouring the liquid content, the opening and closing plug is suspended and held by the suspension unit and the opening and closing plug is closed, so that the liquid content is pourable by opening of the pouring nozzle opening and closing mechanism.

4 Claims, 39 Drawing Sheets

(58) Field of Classification Search
USPC ..................................................... 220/495.01
See application file for complete search history.

(56) References Cited

U.S. PATENT DOCUMENTS

| | | | | |
|---|---|---|---|---|
| 2007/0145072 | A1* | 6/2007 | Cook | B65D 77/067 222/105 |
| 2009/0057339 | A1 | 3/2009 | Piscotty et al. | |
| 2011/0215136 | A1 | 9/2011 | Ouillette | |
| 2017/0050756 | A1* | 2/2017 | Hill | B65D 77/067 |
| 2017/0210533 | A1* | 7/2017 | Couvillon | B65D 5/008 |

FOREIGN PATENT DOCUMENTS

| | | | | |
|---|---|---|---|---|
| JP | 53-154127 | | 12/1978 | |
| JP | 61-172056 | | 10/1986 | |
| JP | 63-013867 | | 1/1988 | |
| JP | 63-192283 | | 12/1988 | |
| JP | 6-171668 | | 6/1994 | |
| JP | 7-315436 | | 12/1995 | |
| JP | 2007-091334 | | 4/2007 | |
| JP | 2015-000740 | | 1/2015 | |
| JP | 5850591 | | 8/2016 | |
| WO | WO-9116246 | A * | 10/1991 | B65D 5/48014 |
| WO | WO-2011020837 | A1 * | 2/2011 | B65D 77/067 |
| WO | WO-2019135942 | A1 * | 7/2019 | A47B 73/00 |

* cited by examiner

BAG-IN BOX

TECHNICAL FIELD

The present invention aims to provide a bag-in box including: a storage box which is provided with a through hole of a pouring nozzle at a lower end of a side wall; and a suspension container which is made of a film material and is suspended in the storage box, wherein the pouring nozzle attached to a lower end of the suspension container is drawn out from the through hole and an opening and closing mechanism is attached to an end portion thereof.

BACKGROUND ART

Conventionally, as interest in environmental issues such as global warming has increased in recent years, efforts such as resource saving, energy saving, and easy disposal of packaging containers are proceeding. In addition, development and popularization corresponding to those demands are being accelerated.

A bag-in box is such an environmentally-friendly packaging container, which is composed of a plastic interior container and an exterior container including a corrugated cardboard case as a main body, and is a combination container used for a liquid (for some liquids containing a viscous substance or a solid).

Among them, this invention relates to an interior container of so-called “film type”. “Film type” is generally a film bag made by thermally welding two or three layers of films via a cotton towel method or an impulse sealing method. In order to fill and discharge contents, a spout molded by an injection molding method is thermally welded to the interior container main body.

The exterior container is generally a corrugated cardboard case, and a material constitution and form thereof are selected according to the required quality such as capacity, transportation conditions, and post line suitability.

As those composed of such a “film type” interior container and an exterior container including a cardboard case as a main body, the following are known in the prior art.

1) Examples with Pour Spout on Side Surface of Exterior Container
   - US Patent Publication No. 2009-57339 (see Patent Document 1)
   - JP Utility Model Publication No. S63-192283 (see Patent Document 2)
   - JP Utility Model Publication No. S53-154127 (see Patent Document 3)
   - JP Utility Model Publication No. S63-13867 (see Patent Document 4: Inclined bottom portion on exterior container)
   - U.S. Pat. No. 3,453,033 (see Patent Document 5: Inclined bottom portion on exterior container)
   - JP Utility Model Publication No. S61-172056 (see Patent Document 6)
2) Examples of Suspending and Holding Interior Container on Upper Portion of Exterior container
   - JP Patent Publication No. H06-171668 (see Patent Document 7)
3) Examples of Attaching Reinforcing Material to Side Wall of Exterior Container
   - JP Patent Publication No. H07-315436 (see Patent Document 8)

However, in the above prior art, the liquid content in the “film type” interior container is hardly poured out to the end.

For example, the liquid content remaining in the “film type” interior container cannot be reliably discharged to the end by merely inclining the bottom portion as in JP-UM-A-563-13867 (see Patent Document 4: Inclined bottom portion on exterior container) or U.S. Pat. No. 3,453,033 specification (see Patent Document 5: Inclined bottom portion on exterior container).

Therefore, the inventors of the present invention have previously proposed a bag-in box in Japanese Patent Application No. 2015-27038 (see Japanese Patent No. 5850591, Patent Document 9), the bag-in box including a storage box which is provided with a through hole of a pouring nozzle on a lower side wall and a suspension container which is made of a film material and is capable of storing the storage box in a suspended state, an upper portion thereof being provided with a check valve therein and a pouring nozzle being attached to a lower end thereof, the pouring nozzle attached to the lower end of the suspension container being drawn out from the through hole, and an automatic closing valve being attached to an end portion thereof, wherein both sides of a bottom portion of the storage box are provided bases for holding the suspension container inclined inward from an outer side from above the through hole, and an intermediate position thereof is formed with a V-type guide groove for guiding the lower end of the suspension container toward an end portion of the pouring nozzle, while an upper portion of the storage box is provided with a suspension unit for suspending and holding the opening and closing plug provided at an upper portion of the suspension container.

PRIOR ART DOCUMENT

Patent Document

Patent Document 1: US Patent Publication No. 2009-57339
Patent Document 2: JP Utility Model Publication No. S63-192283
Patent Document 3: JP Utility Model Publication No. S53-154127
Patent Document 4: JP Utility Model Publication No. S63-13867
Patent Document 5: U.S. Pat. No. 3,453,033
Patent Document 6: JP Utility Model Publication No. S61-172056
Patent Document 7: JP Patent Publication No. H06-171668
Patent Document 8: JP Patent Publication No. H07-315436
Patent Document 9: Japanese Patent No. 5850591

SUMMARY OF THE INVENTION

Problems to be Solved by the Invention

However, in the invention of the Japanese Patent Application No. 2015-27038 (see Japanese Patent No. 5850591 and Patent Document 9), the liquid content is reliably discharged to the end, but the structure is complicated and further cost reduction is required for commercialization.

The present invention has been made in view of such circumstances in the prior art, and an object of the present invention is to provide a bag-in box capable of achieving more significant cost reduction.

Means for Solving the Problem

In order to solve the above conventional problem, a bag-in box of the present invention is provided, which is to be used by drawing out a pouring nozzle opening and closing mechanism attached to a lower end of a suspension container from a through hole, the bag-in box including:

a storage box which is provided with the through hole of the pouring nozzle opening and closing mechanism at a lower end of a side wall; and the suspension container which is made of a film material and is suspended in the storage box, wherein a bottom portion of the storage box is provided with a base for holding the suspension container inclined toward the through hole, and a base plate configuring the base is configured to include a horizontal portion in which side plates provided partway on both sides of the base plate are folded downward and a slope portion which protrudes from a position of the side plates of the base plate and folded obliquely downward, and to hold the suspension container to be inclined toward the through hole, while an upper portion of the storage box is provided with a suspension unit for suspending and holding an opening and closing plug provided at an upper portion of the suspension container, when filling a liquid content, the opening and closing plug of the suspension container is opened, and when pouring the liquid content, the opening and closing plug provided at the upper portion of the suspension container is suspended and held by the suspension unit and the opening and closing plug is closed, and in the storage box, the pouring nozzle opening and closing mechanism attached to the lower end of the suspension container is drawn out from the through hole, so that the liquid content is pourable by opening of the pouring nozzle opening and closing mechanism.

In the bag-in box of the present invention, the opening and closing plug provided at the upper portion of the suspension container includes a check valve therein, the opening and closing plug of the suspension container is opened to fill the suspension container with the liquid content, the opening and closing plug is closed to discharge air in the suspension container from the check valve to fill the suspension container with only the liquid content, and the suspension container is fitted in the storage box to draw out the pouring nozzle opening and closing mechanism at the lower end of the suspension container from the through hole.

The opening and closing plug provided at the upper portion of the suspension container is suspended and held by the suspension unit.

The bag-in box of the present invention, which is to be used by drawing out the pouring nozzle opening and closing mechanism attached to the lower end of a suspension container from the through hole, includes: the storage box which is provided with the through hole of the pouring nozzle opening and closing mechanism at the lower end of the side wall; and the suspension container which is made of a film material and is suspended in the storage box, wherein the bottom portion of the storage box is provided with a base for holding the suspension container above the through hole, and the base is formed with a slope downward the through hole of the pouring nozzle opening and closing mechanism.

In the bag-in box of the present invention, storage boxes provided with the through hole of the pouring nozzle opening and closing mechanism at the lower end of the side wall are displayable side by side on a commodity display shelf by narrowing a width of the through hole forming a side wall surface to be smaller than a width of the other side wall surface orthogonal thereto.

Effect of the Invention

In a first invention, since the bag-in box, which is to be used by drawing out a pouring nozzle opening and closing mechanism attached to a lower end of a suspension container from a through hole, includes: the storage box which is provided with the through hole of the pouring nozzle opening and closing mechanism at the lower end of the side wall; and the suspension container which is made of a film material and is suspended in the storage box, a bag-in box can be provided which is capable of reliably discharging the liquid content remaining in the "film type" interior container of the bag-in box to the end.

In a second invention, since the air can be discharged via the check valve without remaining the liquid content in the suspension container, a bag-in box can be provided which is capable of reliably discharging the liquid content to the end while keeping the liquid content fresh with prevention of oxidation of the liquid content.

In a third invention, since the bottom portion of the storage box is provided with the base and the base is formed with the slope downward the through hole of the pouring nozzle opening and closing mechanism, a bag-in box can be provided which is capable of reliably discharging the liquid content to the end.

In a fourth invention, since the storage box is displayable side by side on a commodity display shelf by narrowing the width of the storage box, a bag-in box can be provided in which the storage box can be displayed not only in a department store but also in a supermarket or a convenience store, and the cost is very low due to a standardization.

BRIEF DESCRIPTION OF DRAWINGS

FIG. 38(*b*) is a perspective view showing a state where the holding mechanism is cut at a center thereof.

FIG. 39(*b*) is a perspective view showing a state where the tubular body and a lid body are cut at a center thereof.

FIG. 47(*b*) is a perspective view showing a state where the tubular housing and the upper operation lever body are cut at a center thereof.

FIG. 48(*b*) is a perspective view showing a state where the closing plug and the tubular slide body are cut at a center thereof.

FIG. 49(*b*) is a perspective view showing a state where the lid body is cut at a center thereof.

FIG. 50(*b*) is a perspective view showing a state where the operation lever is cut at a center thereof.

DESCRIPTION OF EMBODIMENTS

Next, an embodiment of a bag-in box according to the present invention will be described with reference to FIGS. 1 to 58. FIGS. 1 to 35 show a storage box, FIGS. 36 to 44 show an opening and closing plug of a suspension container, and FIGS. 45 to 58 show a pouring nozzle opening and closing mechanism used for the suspension container.

FIGS. 1 to 35 show an example of a storage box 11 configuring the bag-in box according to the present invention, and the storage box 11 further includes a base 12.

Figure 1:
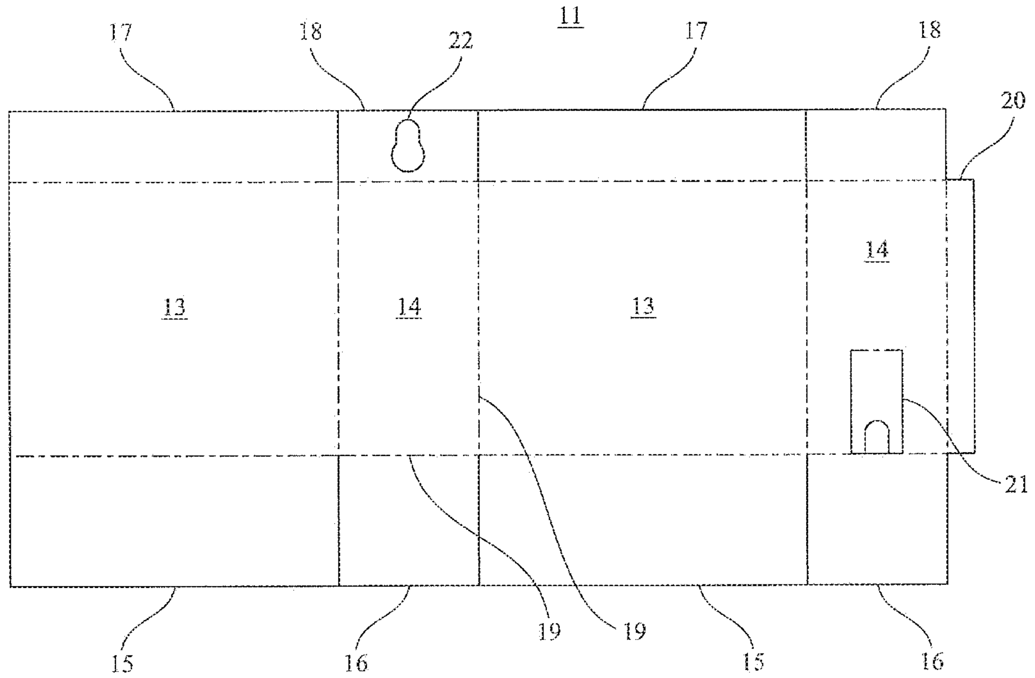
FIG. 1 is a developed view showing an example of a storage box configuring a bag-in box according to the present invention.
Figure 2:
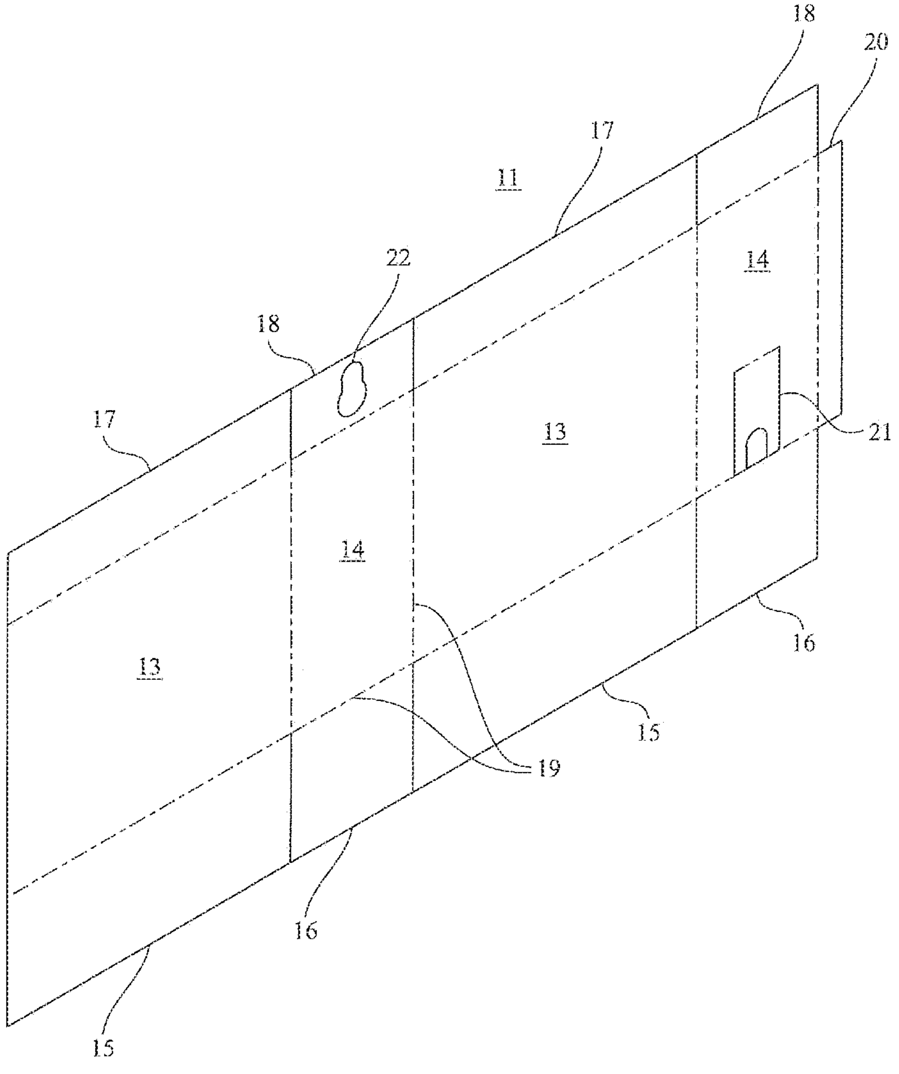
FIG. 2 is a perspective view of the storage box.

In a developed view in FIGS. 1 and 2, the storage box 11 includes: a side plate portion in which wide side plates 13 and narrow side plates 14 having different widths are sequentially connected in pairs; wide bottom plates 15 and narrow bottom plates 16 having different widths respectively disposed on upper and lower sides of each of the side plates 13 and 14; wide top plates 17; and narrow top plates 18, each being connected via folds 19. In the figures, 20 denotes a connecting piece provided at an end portion of the side plate portion, 21 denotes a through hole of a pouring nozzle opening and closing mechanism provided at a lower end of one of the narrow side plates 14, and 22 denotes a suspension unit including an opening portion for suspending and holding an opening and closing plug provided at an upper portion of the suspension container.

Figure 3:
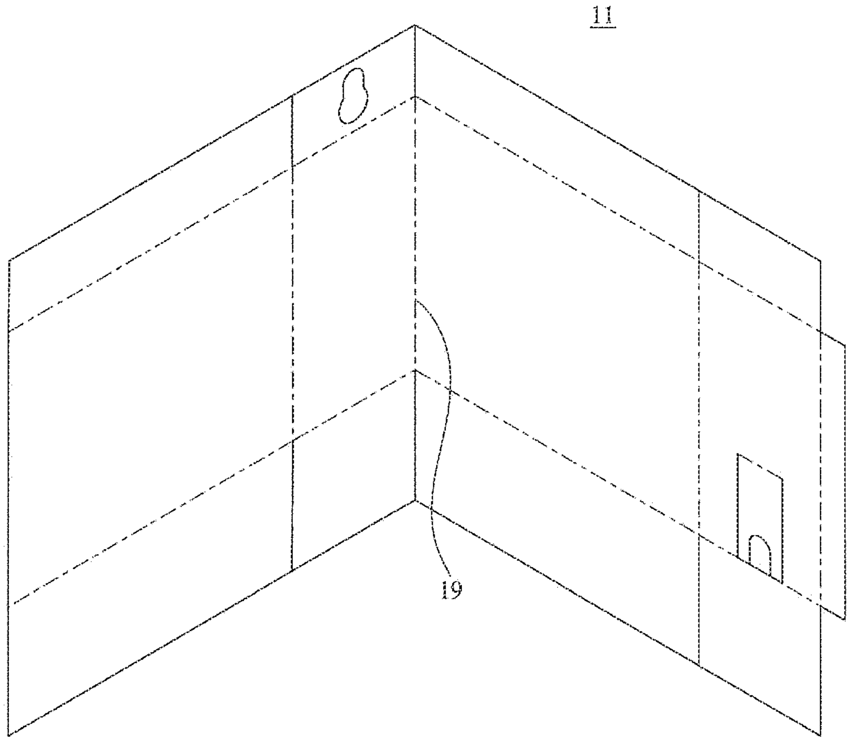
FIG. 3 is a perspective view showing an assembling process of the storage box, in a state where the storage box is folded into an L shape at a center portion.
Figure 4:
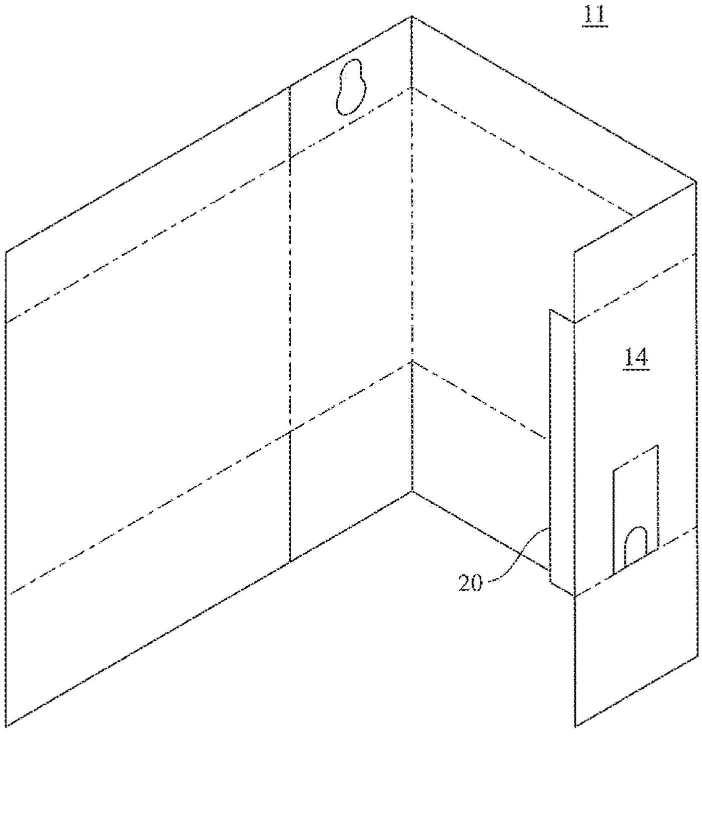
FIG. 4 is a perspective view showing a state where a narrow side plate on one side is further folded inward.
Figure 5:
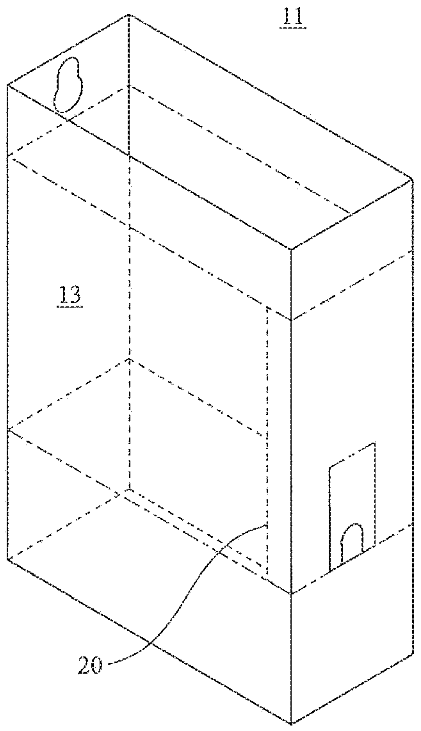
FIG. 5 is a perspective view showing a state where a wide side plate on the other side is further folded inward.
Figure 6:
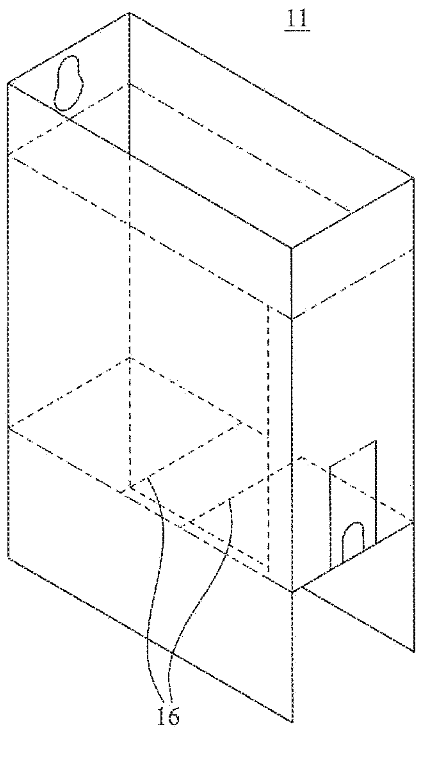
FIG. 6 is a perspective view showing a state where narrow bottom plates on both sides are folded inward so as to be horizontal.
Figure 7:
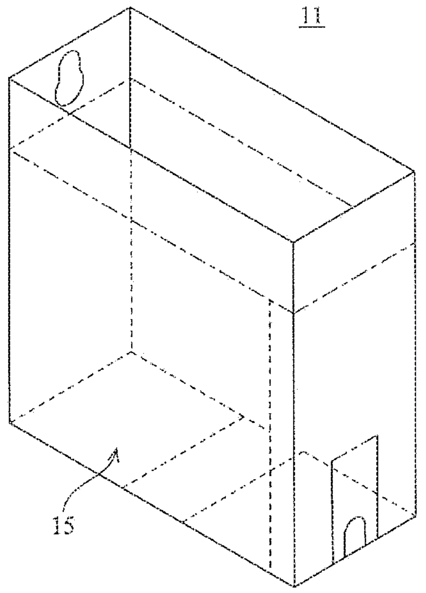
FIG. 7 is a perspective view showing a state where wide bottom plates on both sides are folded inward so as to be horizontal and to have a bottom.

During assembling of the storage box 11, as shown in FIG. 3, the storage box 11 is folded into an L shape at a fold 19 at a center portion of the side plate portion; as shown in FIG. 4, a narrow side plate 14 on one side and the connecting piece 20 is folded inward; and as shown in FIG. 5, a wide side plate 13 on the other side is folded inward and an end portion thereof is bonded and fixed to the connecting piece 20. Next, as shown in FIG. 6, the narrow bottom plates 16 on both sides are folded inward so as to be horizontal; and as shown in FIG. 7, the wide bottom plates 15 on both sides are folded inward so as to be horizontal and to form a bottom portion.

FIGS. 8 to 13 show a base plate 12*a* configuring the base 12.

Figure 8:
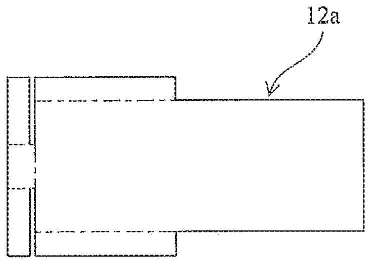
FIG. 8 is a plan view showing a base plate configuring a base.
Figure 9:
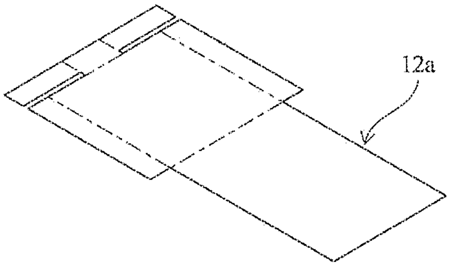
FIG. 9 is a perspective view of the base plate.
Figure 10:
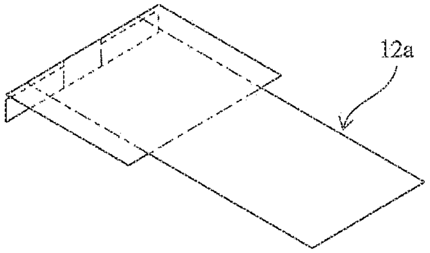
FIG. 10 is a perspective view showing a state where a rear end portion of the base plate is folded downward.
Figure 11:
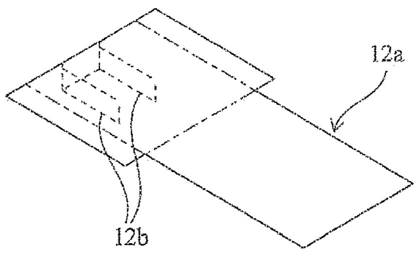
FIG. 11 is a perspective view showing a state where both sides of the rear end portion of the base plate are further folded inward.

That is, in the base plate 12*a* shown in FIGS. 8 and 9, a rear end portion of the base plate 12*a* is folded downward as shown in FIG. 10, and support plates 12*b* on both sides of the rear end portion of the base plate 12*a* are further folded inward as shown in FIG. 11.

Figure 12:
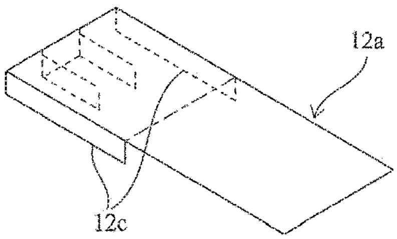
FIG. 12 is a perspective view showing a state where side plates of the base plate are folded downward.
Figure 13:
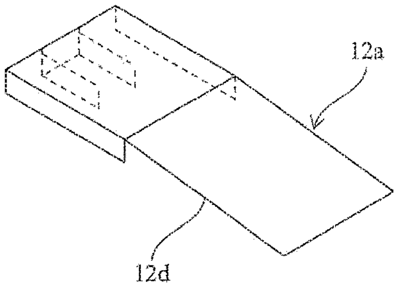
FIG. 13 is a perspective view showing a state where a slope portion of the base plate is folded obliquely downward.

In addition, as shown in FIG. 12, the base plate 12*a* includes a horizontal portion in which side plates 12*c* provided partway on both sides of the base plate 12*a* are folded downward and a slope portion 12*d* which is continuous therewith. As shown in FIG. 13, when the slope portion 12*d* protruding from the position of the side plates 12*c* of the base plate 12*a* is folded obliquely downward, the base 12 is completed.

Figure 14:
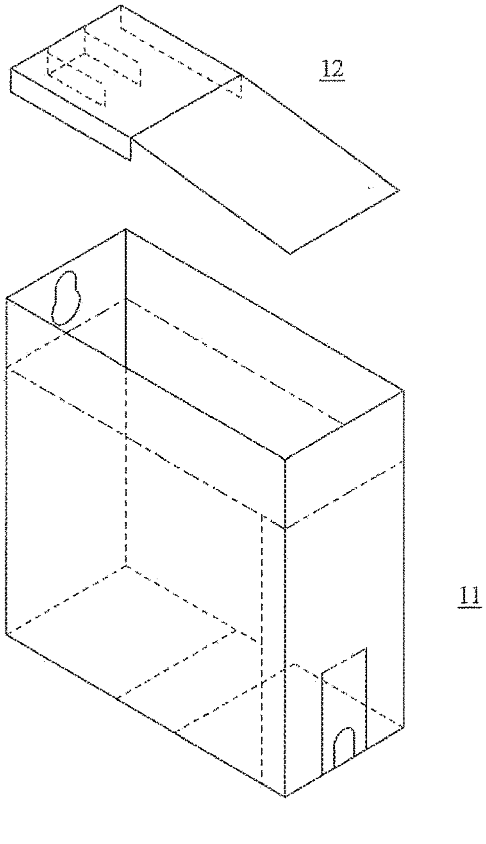
FIG. 14 is a perspective view showing a state where the completed base is to be stored in the storage box.
Figure 15:
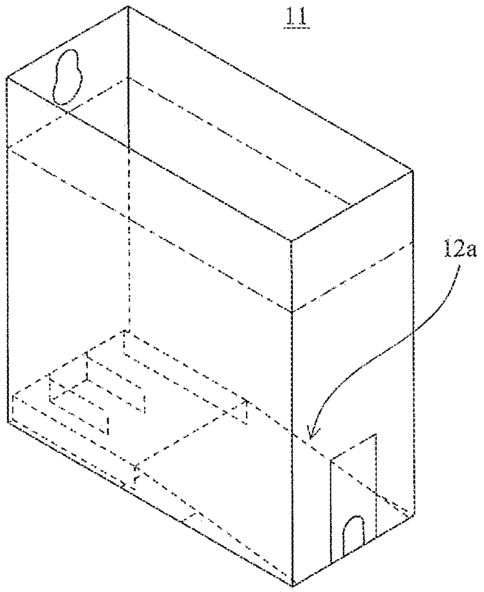
FIG. 15 is a perspective view showing a state where the completed base is stored in the storage box.
Figure 16:
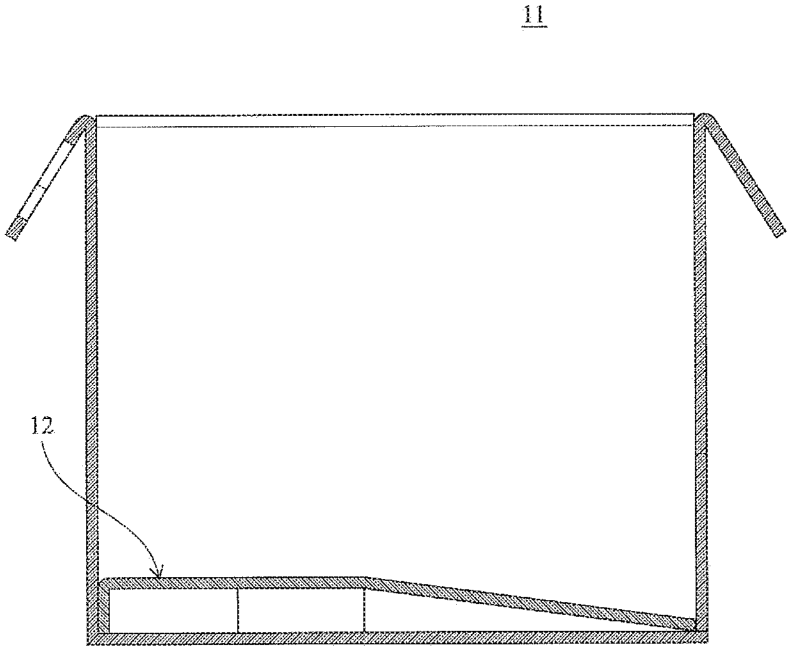
FIG. 16 is a schematic cross sectional view showing the above state.

As shown in FIG. 14, the completed base 12 is stored in the storage box 11 so as to be dropped from above; and as shown in FIGS. 15 and 16, an inclined bottom portion in the storage box 11 is formed.

Figure 17:
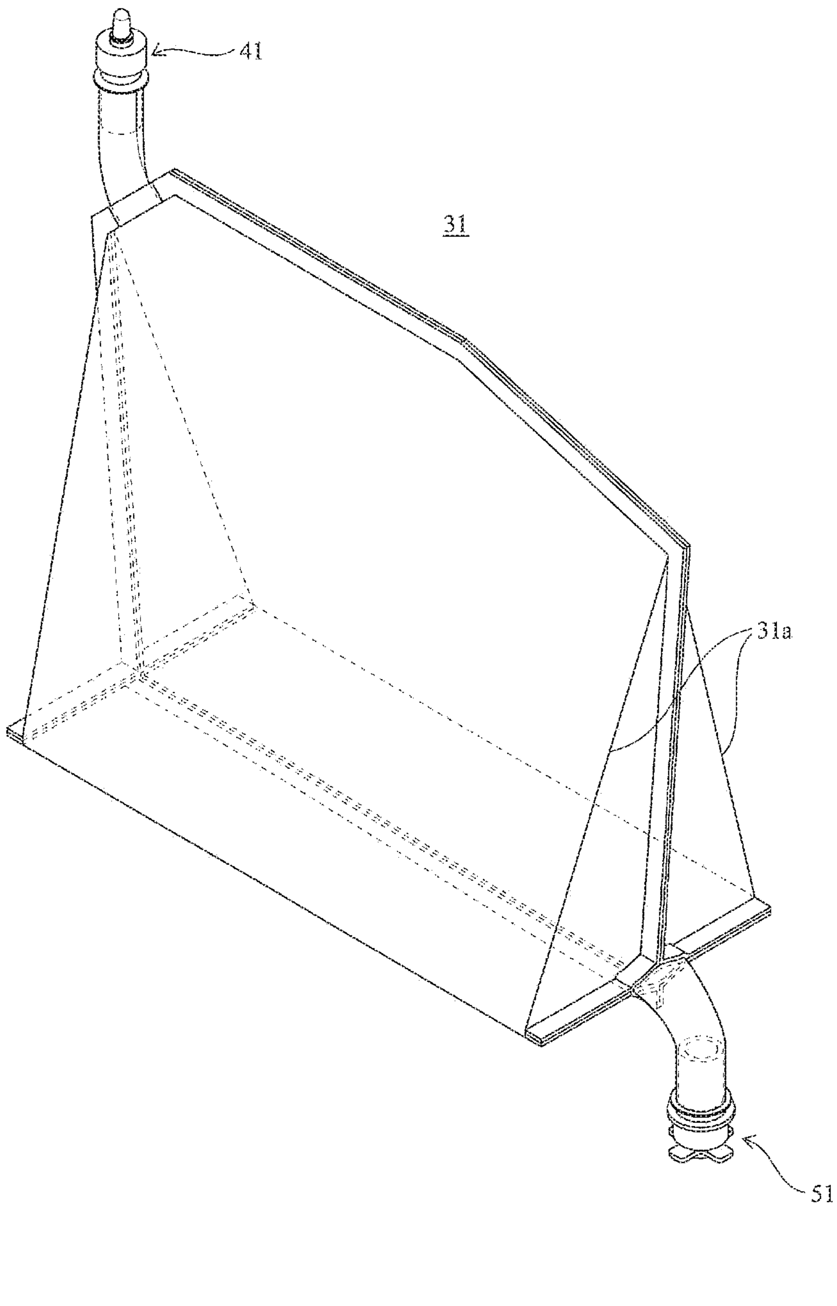
FIG. 17 is a perspective view showing an example of a suspension container made of a film material.

FIG. 17 shows an example of a suspension container 31 made of a film material. Two plastic sheets 31*a* are joined with end pieces in a width direction by means of welding or the like so as to have a substantially triangular shape. An opening and closing plug 41 is attached on an upper end of one side and a pouring nozzle opening and closing mechanism 51 is attached on a lower end of the other side.

Figure 18:
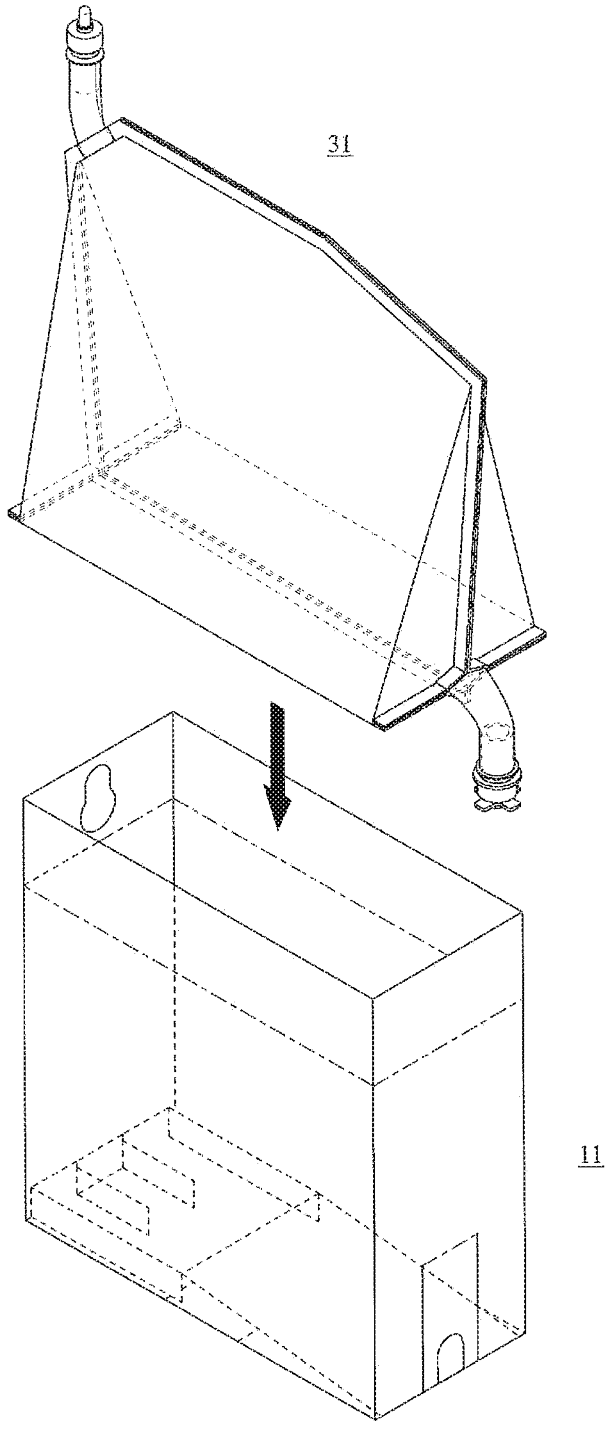
FIG. 18 is a perspective view showing a state where the suspension container made of a film material is to be stored in the storage box.
Figure 19:
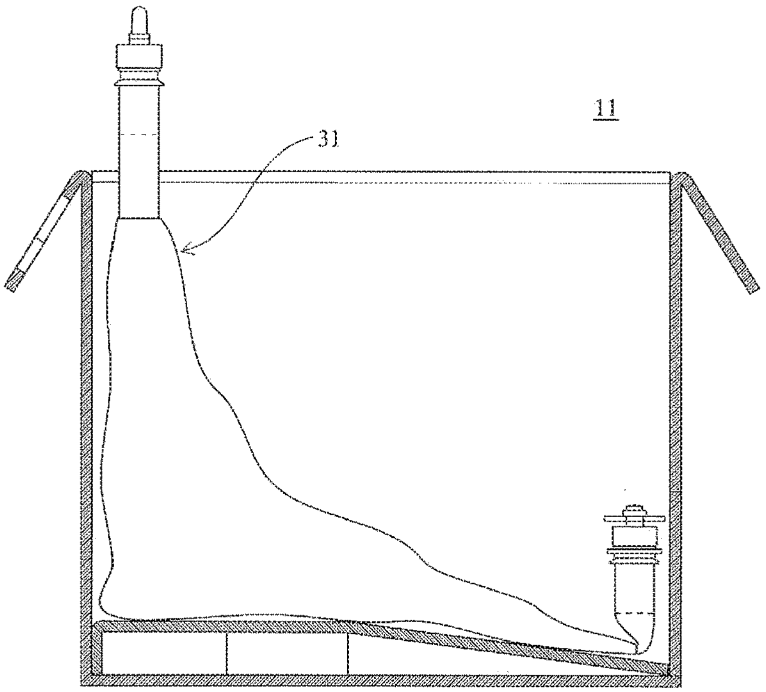
FIG. 19 is a schematic cross sectional view showing a state where the suspension container made of a film material not filled with a liquid content is incorporated in the storage box.

Then, as shown in FIG. 18, the suspension container 31 made of a film material is stored in a manner of being dropped into the storage box 11. In this case, the initial suspension container 31 is crinkled as shown in FIG. 19.

Figure 20:
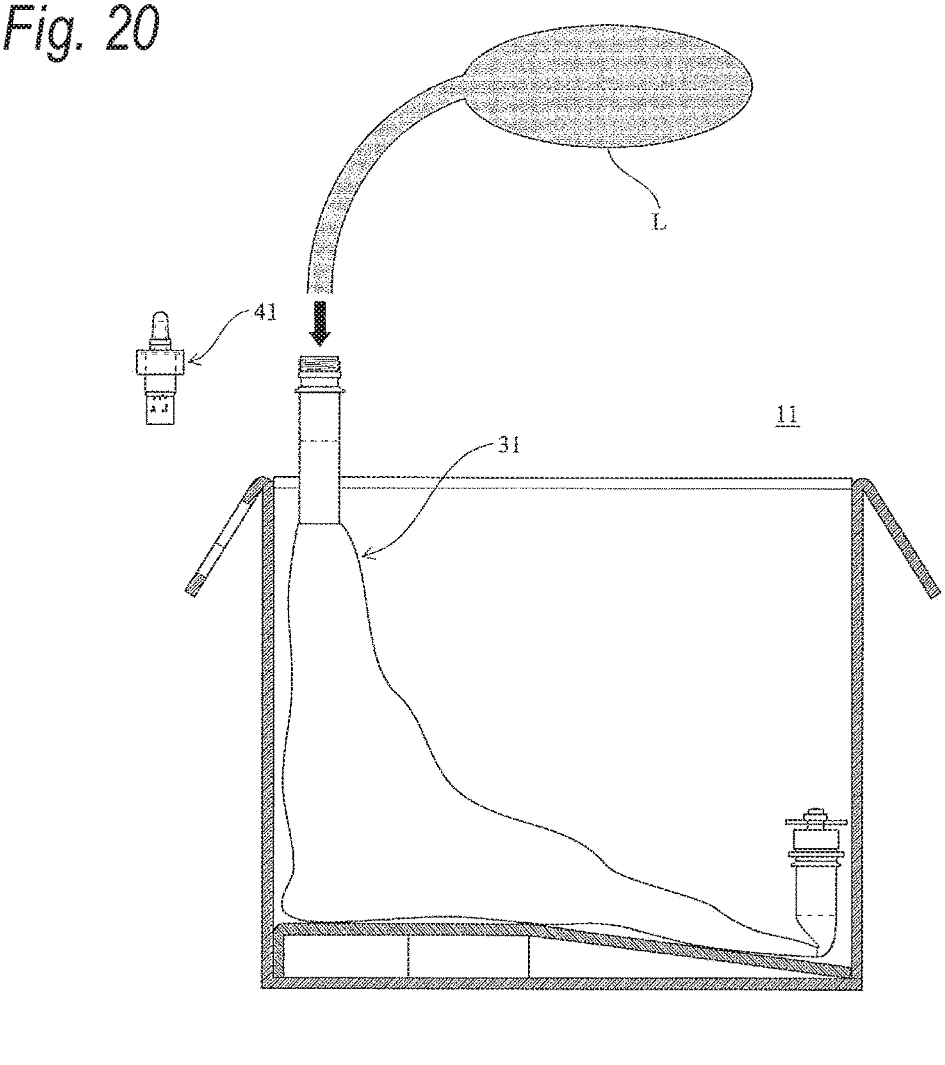
FIG. 20 is a schematic cross sectional view showing a state where a liquid content is to be filled in the suspension container made of a film material.
Figure 21:
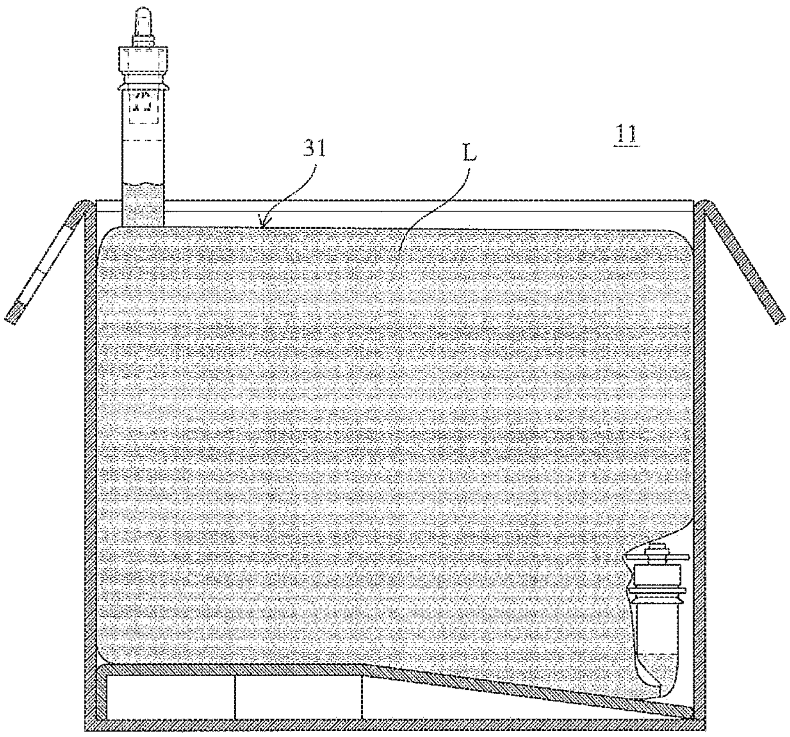
FIG. 21 is a schematic cross sectional view of a state where filling of the liquid content is substantially completed.

Therefore, as shown in FIG. 20, in a state where the suspension container 31 made of a film material unfilled with a liquid content. L is incorporated in the storage box 11, the opening and dosing plug 41 is taken out and the liquid content L is filled by appropriate methods. FIG. 21 shows a state where filling of the liquid content L into the suspension container 31 is substantially completed.

Figure 22:
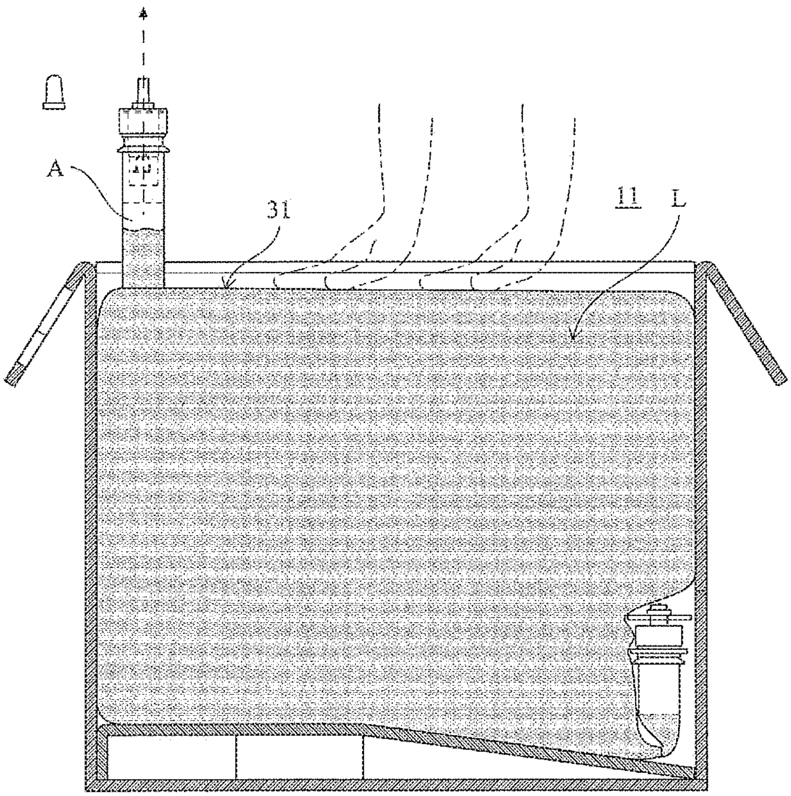
FIG. 22 is a schematic cross sectional view showing a state where the suspension container is filled with the liquid content and air accumulated on an upper portion of the liquid content is to be discharged.
Figure 23:
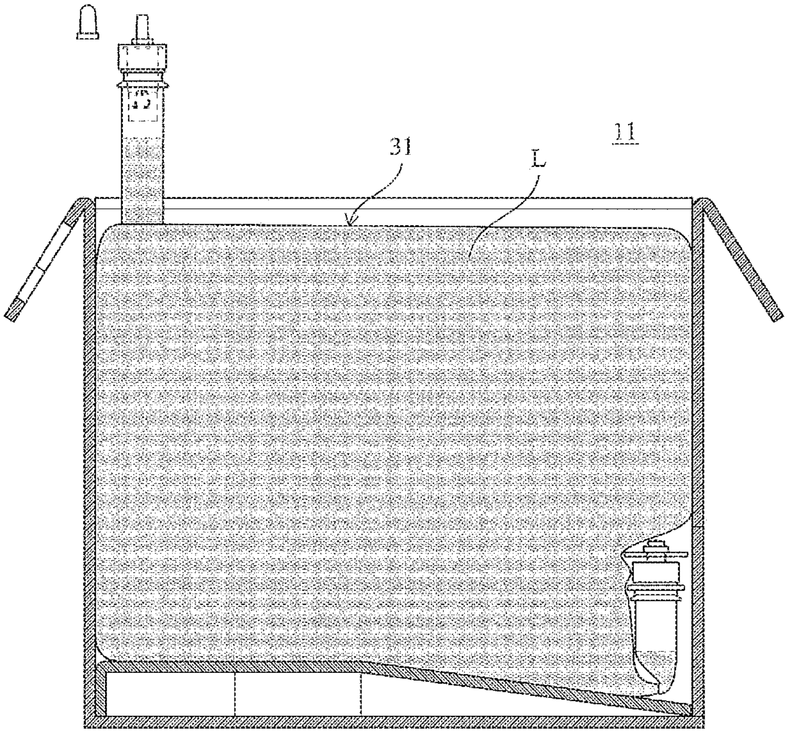
FIG. 23 is a schematic cross sectional view showing a state where discharge of the air is substantially completed.
Figure 24:
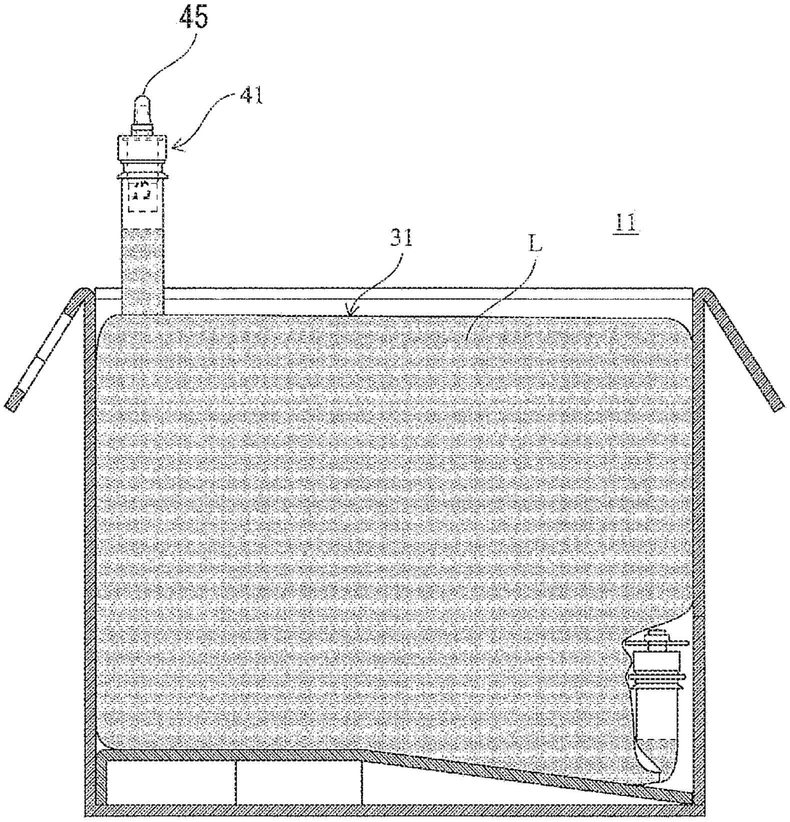
FIG. 24 is a schematic cross sectional view showing a state where a cap is assembled to an opening and closing plug of the suspension container.
Figure 25:
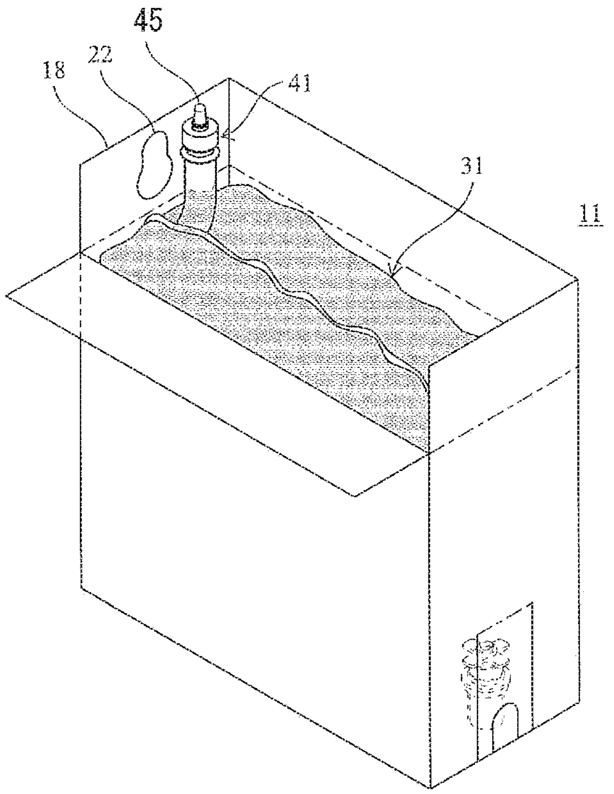
FIG. 25 is a perspective view showing a state where the opening and closing plug of the suspension container is to be assembled to a suspension unit provided in the storage box.
Figure 26:
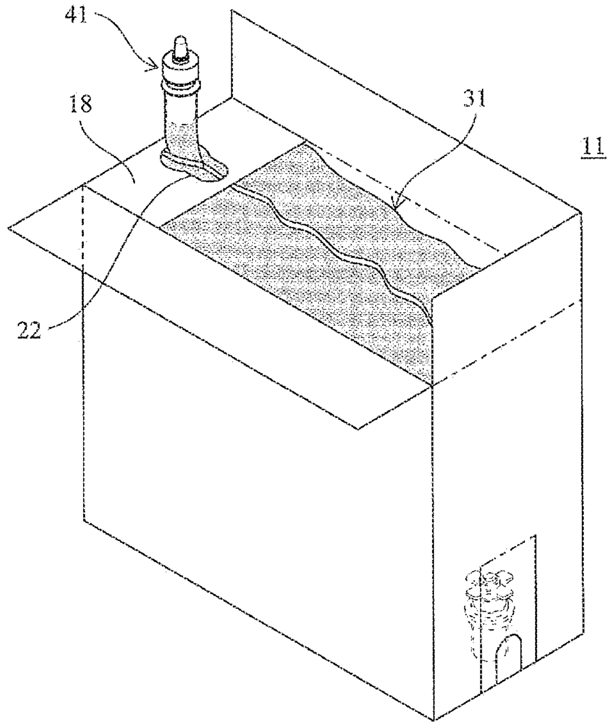
FIG. 26 is a perspective view showing a state where the opening and closing plug of the suspension container is assembled to the suspension unit provided in the storage box.
Figure 27:
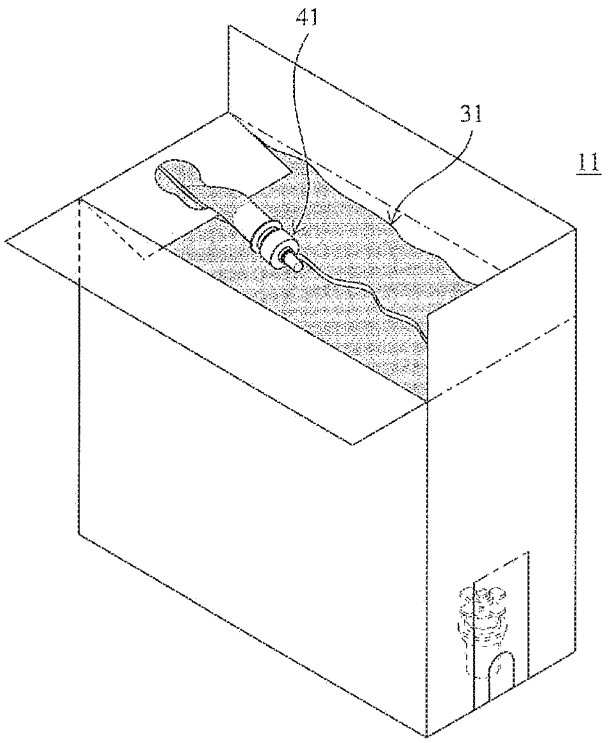
FIG. 27 is a perspective view showing a state where the opening and closing plug of the suspension container is folded on the suspension container.
Figure 28:
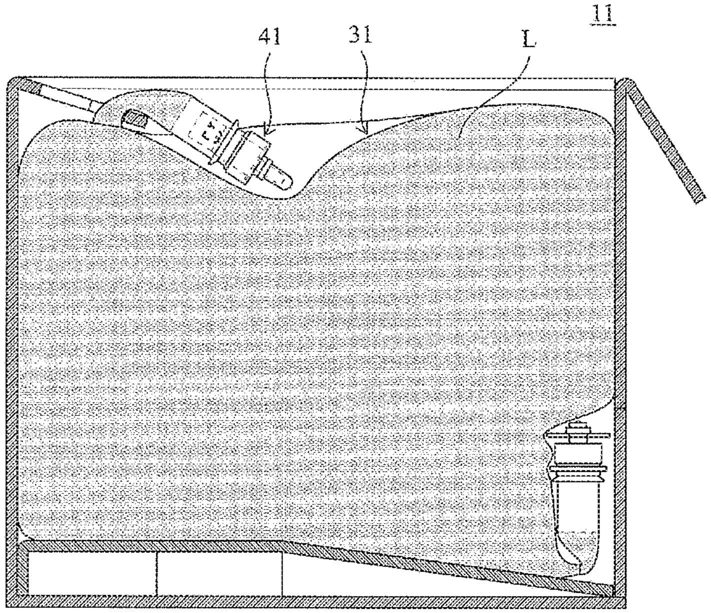
FIG. 28 is a schematic cross sectional view showing the above state.
Figure 29:
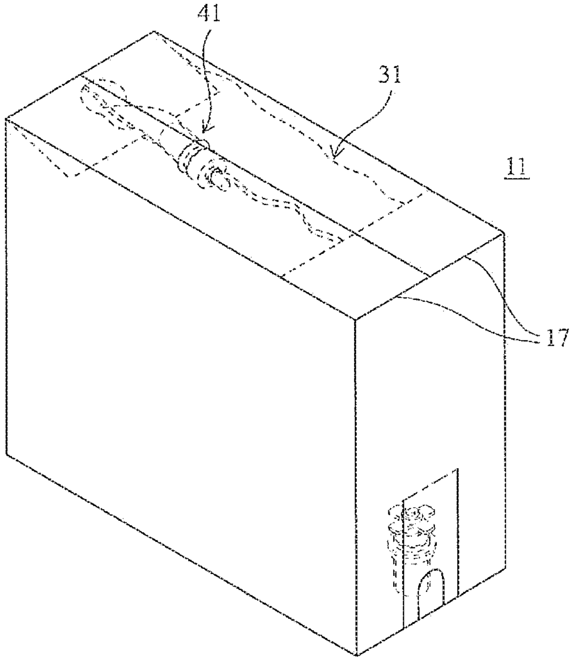
FIG. 29 is a perspective view of a state where a top plate side flap is finally folded over the suspension container.
Figure 30:
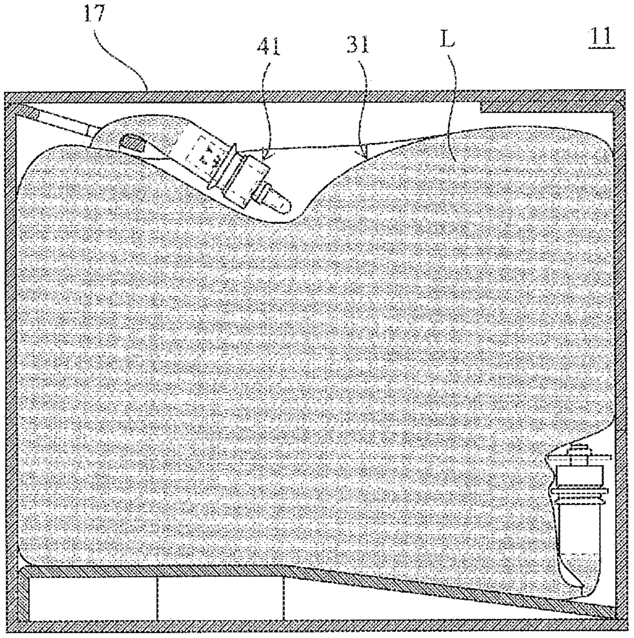
FIG. 30 is a schematic cross sectional view showing the above state.

As shown in FIG. 22, since air A are accumulated in an upper portion of the liquid content L filled in the suspension container 31, the suspension container 31 is pressed to discharge the air A. After discharging the air A from the upper portion of the suspension container 31 as shown in FIG. 23, a cap 45 is assembled to the opening and closing plug 41 of the suspension container 31 as shown in FIGS. 24 and 25, and as shown in FIG. 26, the opening and closing plug 41 of the suspension container 31 is assembled to a suspension unit 22 including a gourd-type opening portion provided on the narrow top plates 18 of the storage box 11. Moreover, as shown in FIGS. 27 and 28, the opening and closing plug 41 of the suspension container 31 is folded on the suspension container 31; and as shown in FIGS. 29 and 30, when the wide top plates 17 are folded over the suspension container 31, the assembly is completed.

Figure 31:
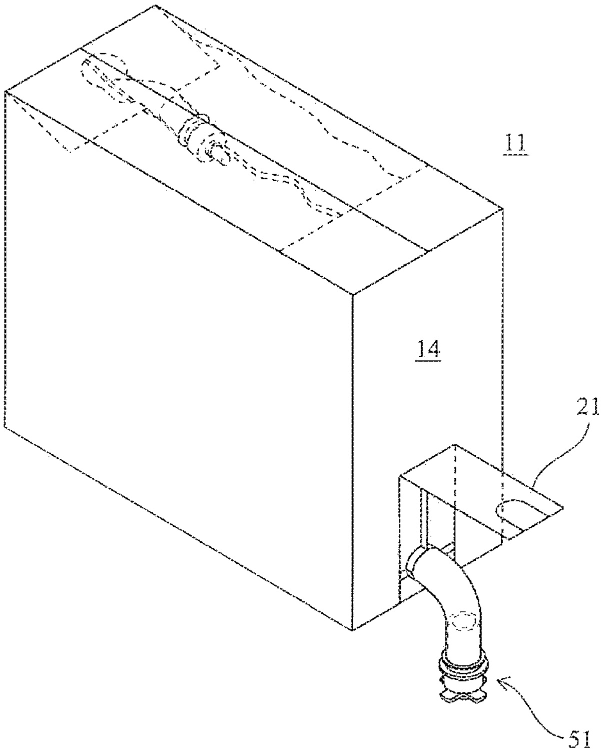
FIG. 31 is a perspective view showing a state where a pouring nozzle opening and closing mechanism is drawn out from a lower portion of the narrow side plate on the one side of the storage box.
Figure 32:
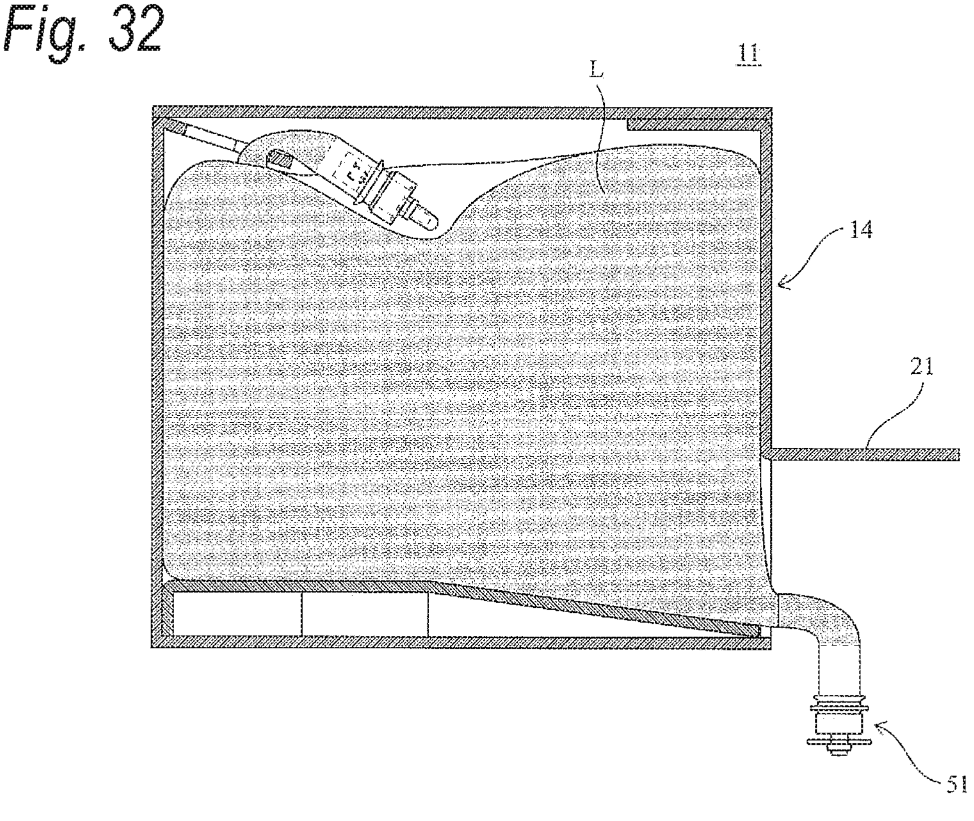
FIG. 32 is a schematic cross sectional view showing the above state.
Figure 33:
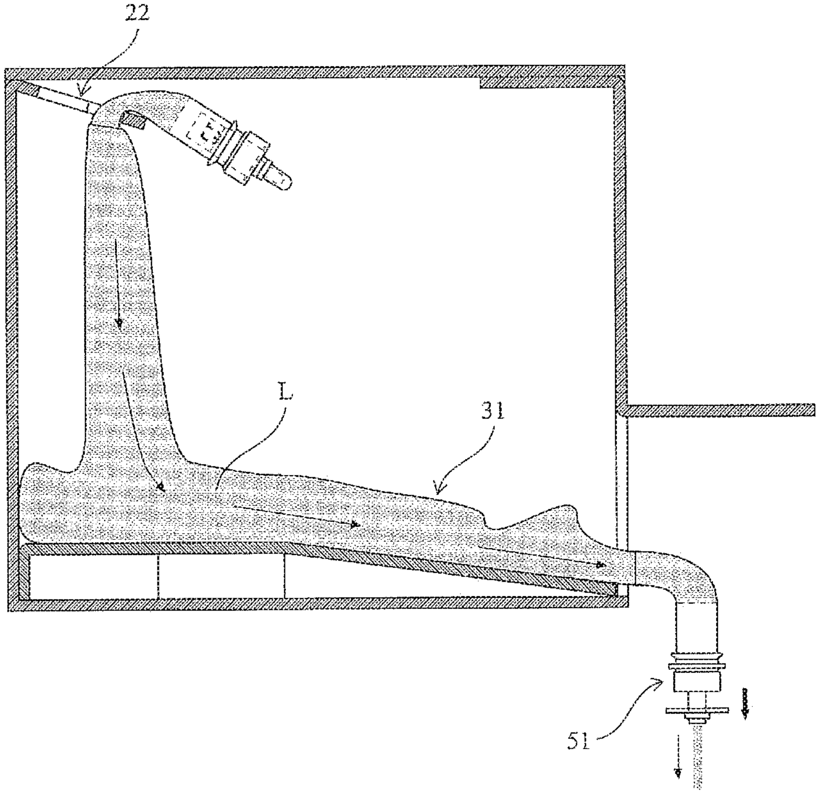
FIG. 33 is a schematic cross sectional view of a state where discharge of the liquid content is substantially completed.

In use of the bag-in box, as shown in FIGS. 31 and 32, the pouring nozzle opening and closing mechanism 51 is drawn out from the through hole 21 at the lower end of the narrow side plate 14 on the one side of the storage box 11, and an operation lever described later is pulled down, thereby using the bag-in box. FIG. 33 shows a state where the discharge of the liquid content L is substantially completed.

Figure 34:
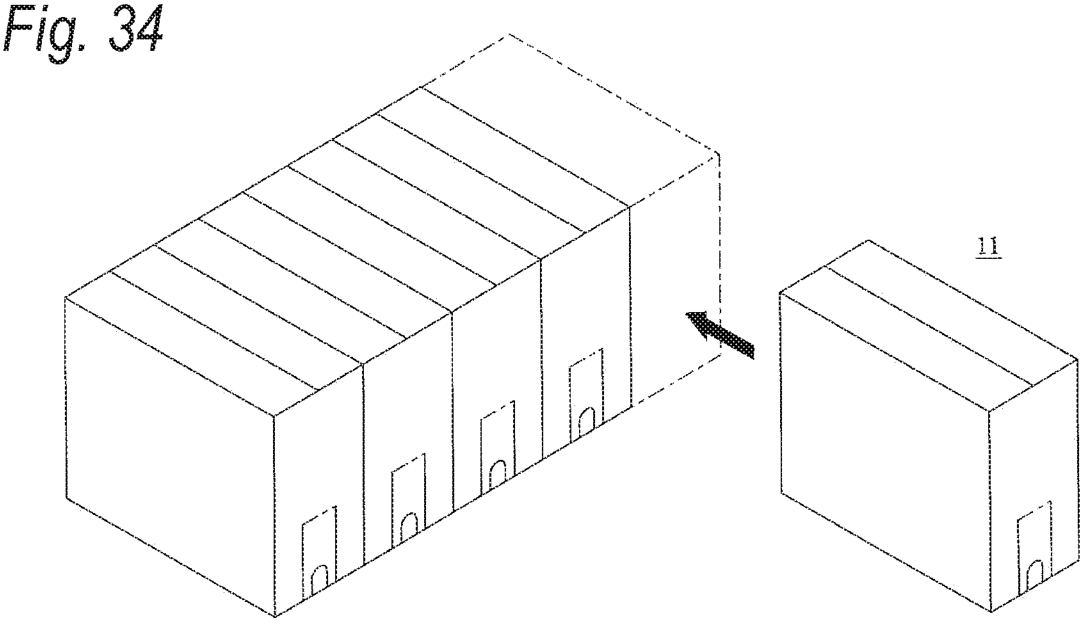
FIG. 34 is a perspective view showing a state where bag-in boxes of the present invention are to be displayed side by side.
Figure 35:
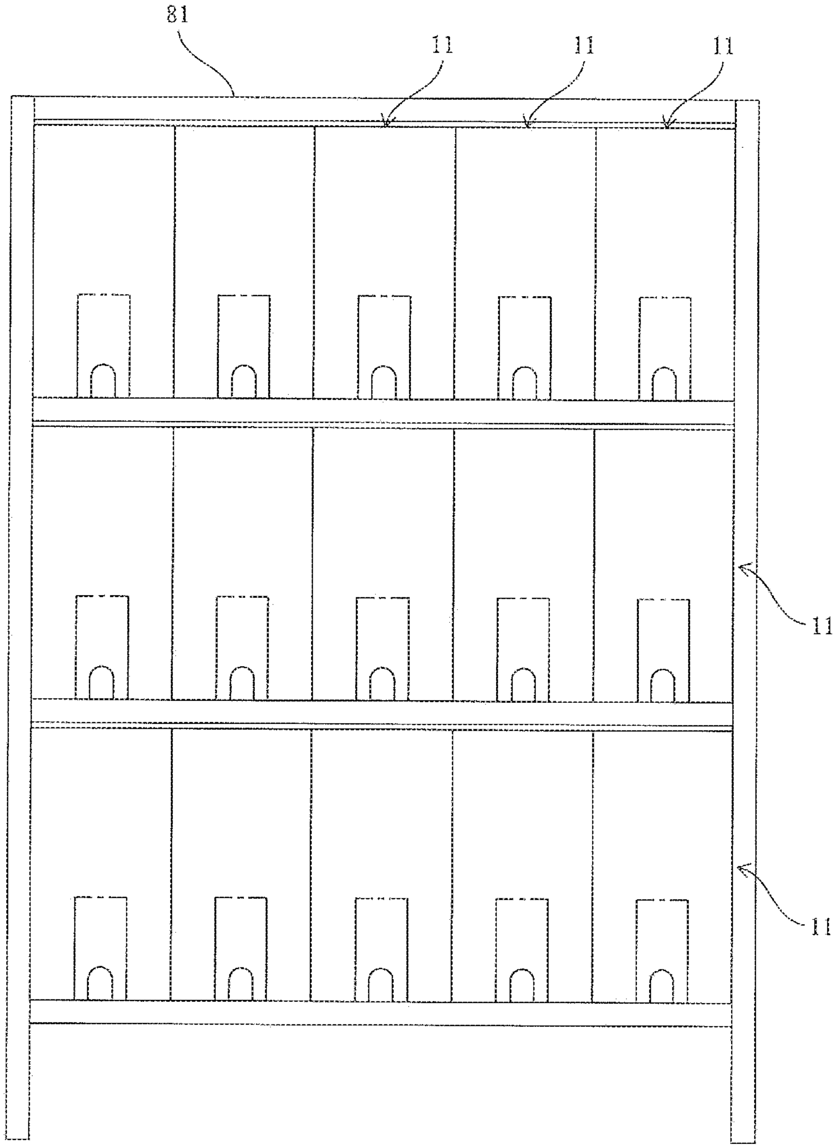
FIG. 35 is a perspective view showing a state where storage boxes are displayed in multiple stages.

The bag-in box of the present invention is narrower than a conventional bag-in box. Therefore, as shown in FIG. 34, even if bag-in boxes are displayed side by side, not much width will be taken, so that storage boxes 11 can be displayed in multiple stages on a display shelf 81 or the like, as shown in FIG. 35.

FIGS. 36 to 44 show the opening and closing plug to be attached to the upper portion of the suspension container 31.

Figure 36:
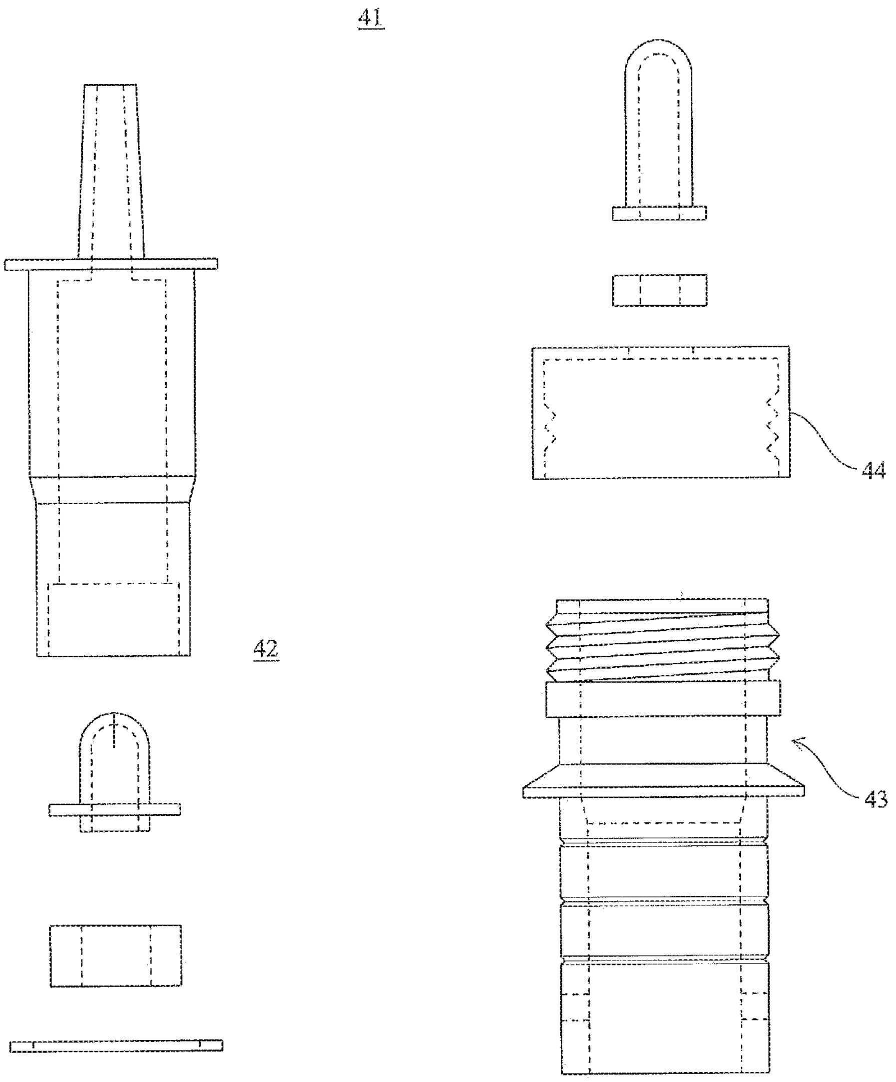
FIG. 36 is a perspective view showing each part of the opening and closing plug of the suspension container in a disassembled state.
Figure 37:
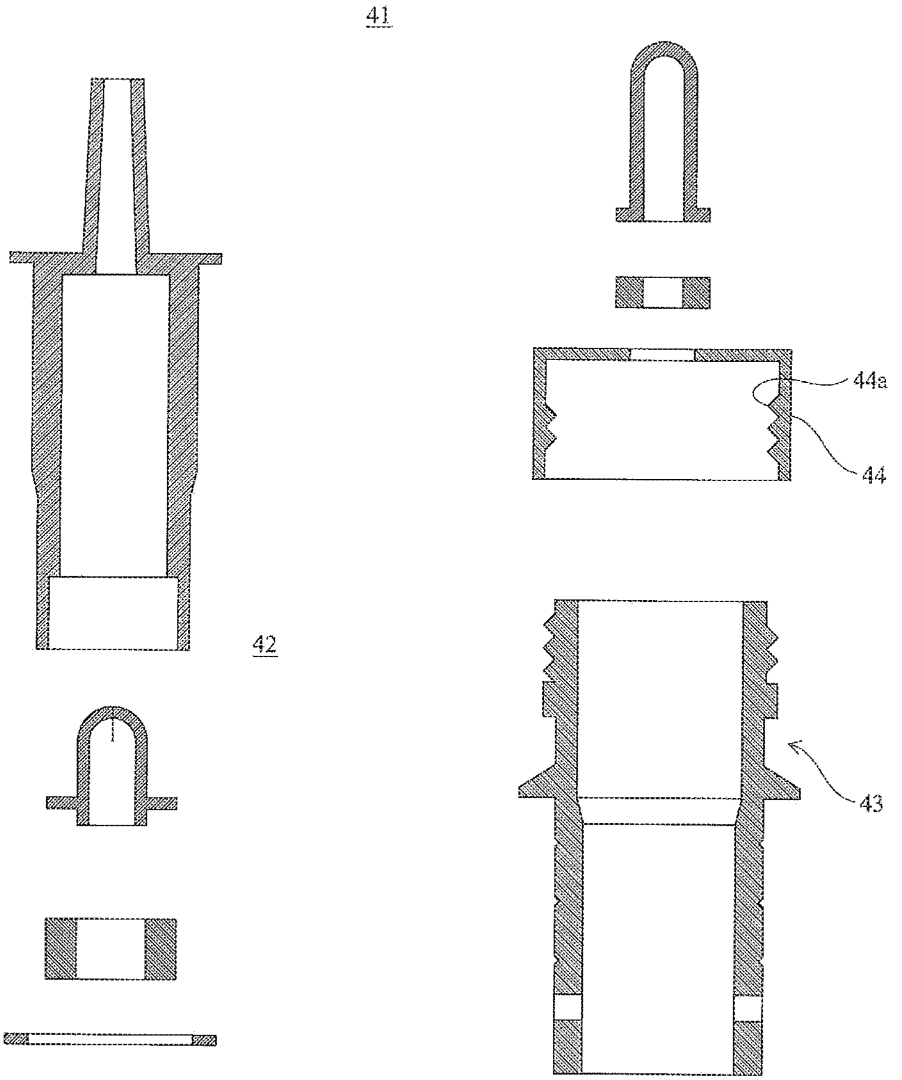
FIG. 37 is a cross sectional view showing the above disassembled state.

First, FIGS. 36 and 37 show each part of the opening and closing plug 41 in a disassembled state. The opening and closing plug 41 includes a holding mechanism 42 of a check valve forming a main part of the opening and closing plug 41, a tubular body 43 storing and holding the holding mechanism 42, and a lid body 44 fixing the holding mechanism 42 to the tubular body 43 at an upper portion of the tubular body 43 by a screw.

Figure 38A:
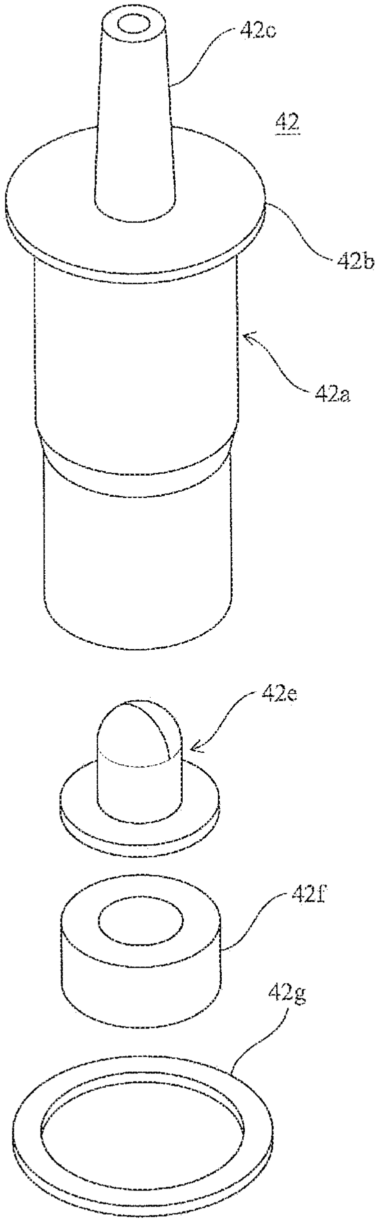
FIG. 38(*a*) is a perspective view showing each part of a holding mechanism of a check valve configuring the opening and closing plug in a disassembled state.
Figure 38B:
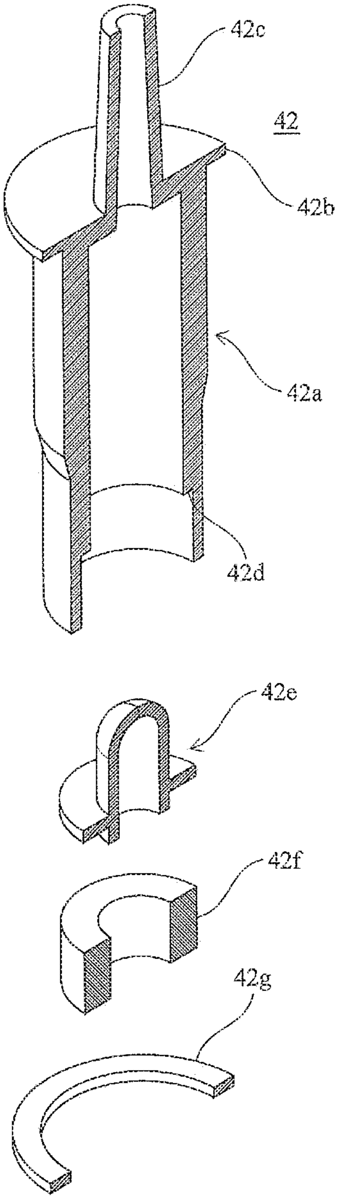

First, when describing the holding mechanism 42 of the check valve with reference to FIGS. 38(*a*) and 38(*b*), in the holding mechanism 42 of the check valve, a deaeration nozzle 42*c* is formed upward at an upper end of a tubular holding portion 42*a* via a flange portion 42*b*.

Then, a check valve 42*e* provided with a notch in an upper end arch portion is engaged with and held by a step 42*d* provided on a lower portion of an inner wall of the tubular holding portion 42*a*. 42*f* denotes a tubular elastic body for preventing the check valve 42*e* from detaching from the inner wall of the tubular holding portion 42*a*, and 42*g* denotes a packing interposed between the flange portion 42*b* at the upper end of the tubular holding portion 42*a* and the tubular body 43.

Figure 39A:
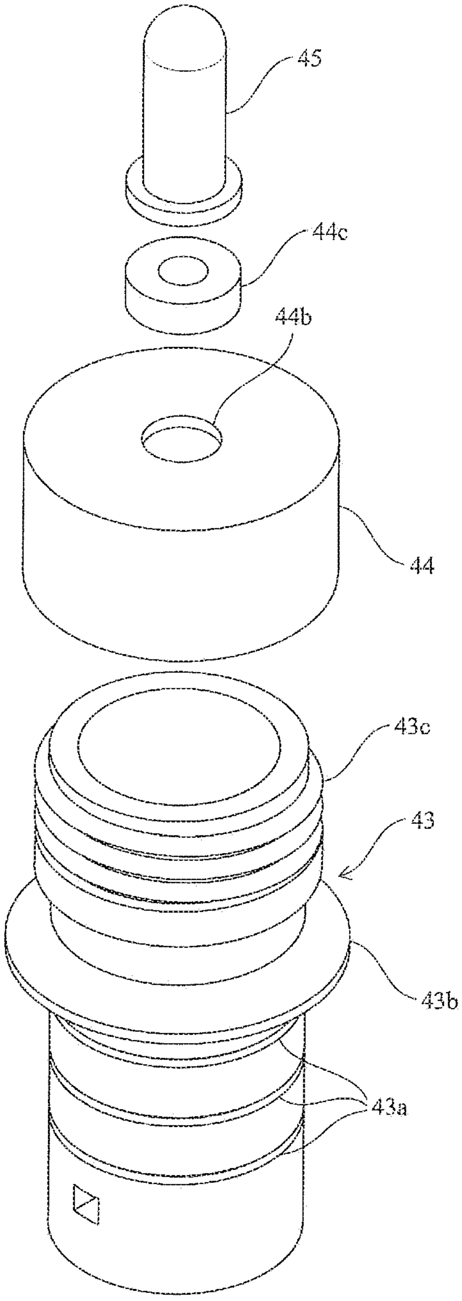
FIG. 39(*a*) is a perspective view showing each part of a tubular body and a lid, which are used for storing the holding mechanism of the check valve, in a disassembled state.
Figure 39B:
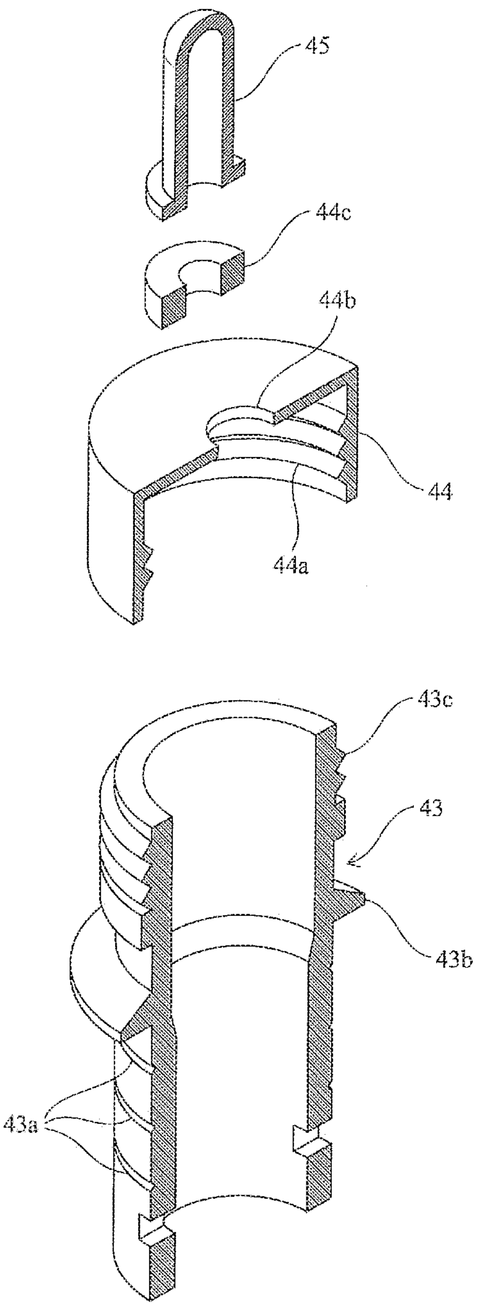

FIGS. 39(*a*) and 39(*b*) show the tubular body 43 and the lid body 44, which are used for storing the holding mechanism 42 of the check valve, and a cap 45 in the opening and closing plug 41. The tubular body 43 is formed with a plurality of circumferential grooves 43*a* for reliably welding the suspension container 31 to a lower outer circumference, and is provided with an outer screw 43*c* via the flange portion 43*b*.

The lid body 44 is fixed to the tubular body 43 by screwing an inner screw 44*a* into the outer screw 43*c* of the tubular body 43. 44*b* denotes a through hole of the deaeration nozzle 42*c*, and 44*c* denotes a packing in attaching the cap 45.

Figure 40:
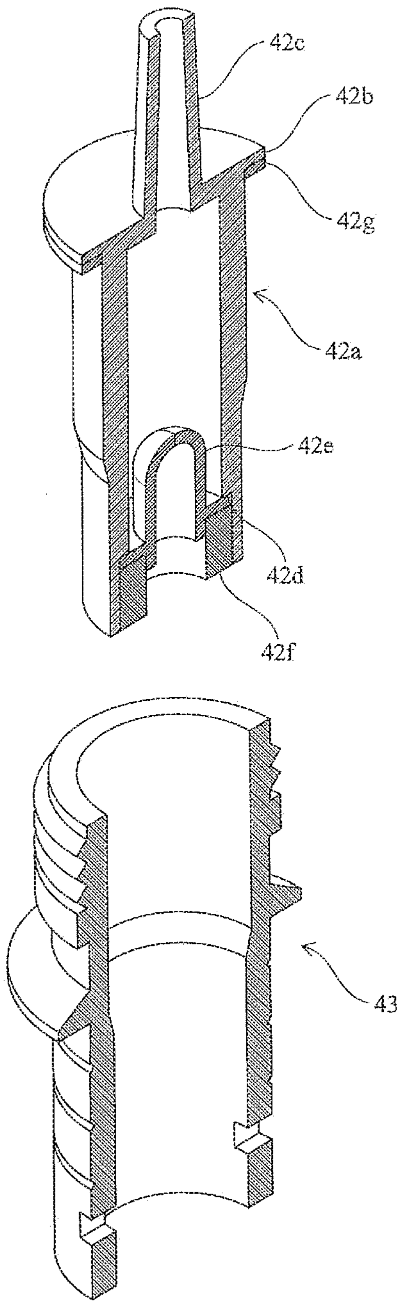
FIG. 40 is a perspective view showing a state where the holding mechanism of the check valve is cut at the center thereof when to be stored in the tubular body.

During assembling of each part, as shown in FIG. 40 from the state shown in FIG. 37, the step 42*d* provided at the lower portion of the inner wall of the tubular holding portion 42*a* is pushed in until the check valve 42*e* is engaged, and the check valve 42*e* is prevented from detaching from the inner wall of the tubular holding portion 42*a* by the tubular elastic body 42*f*.

Figure 41:
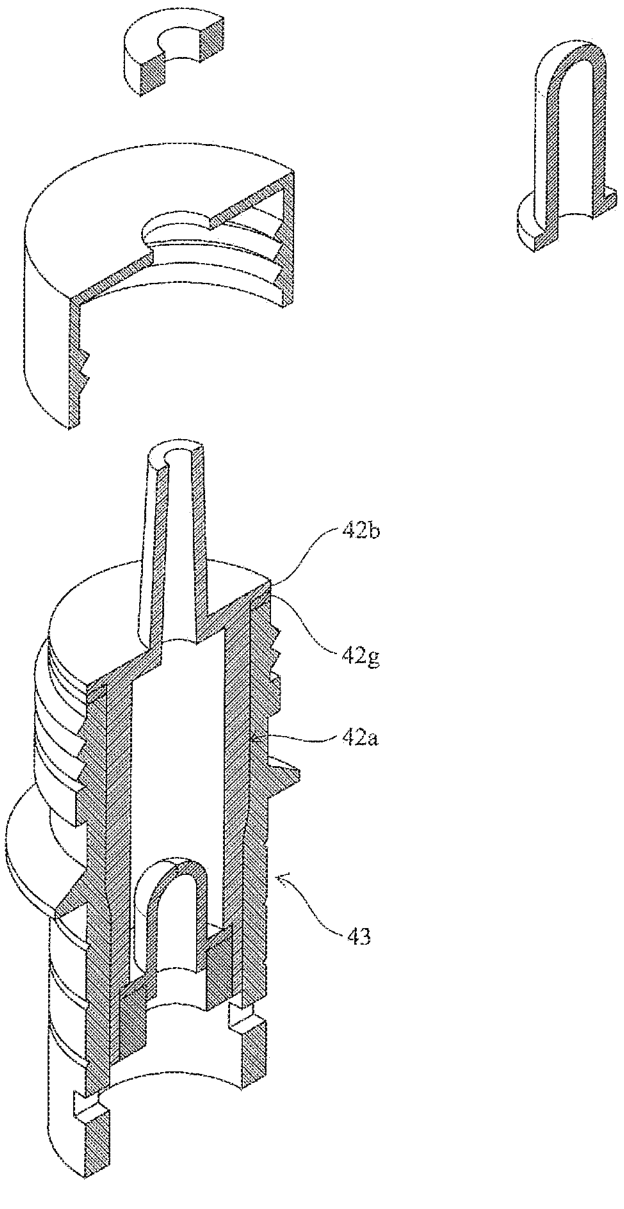
FIG. 41 is a perspective view showing a state where the lid body is cut at the center thereof when to be attached to the tubular body after the holding mechanism of the check valve is stored in the tubular body.

Next, as shown in FIG. 41 from the state shown in FIG. 40, the tubular body 43 is pushed in along an outer circumference from a lower side of the tubular holding portion 42*a*.

At this time, the tubular body 43 is pushed to a position of the flange portion 42*b* at the upper end of the tubular holding portion 42*a*. At the same time, the packing 42*g* is interposed between the upper end of the tubular body 43 and the flange portion 42*b*.

Figure 42:
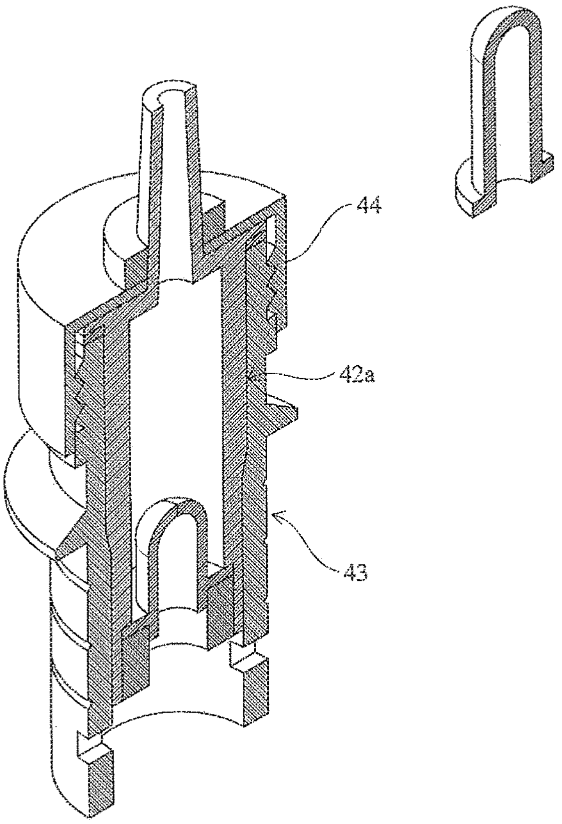
FIG. 42 is a cross sectional view showing a state where the lid body is cut the center thereof after being attached to the tubular body.
Figure 43:
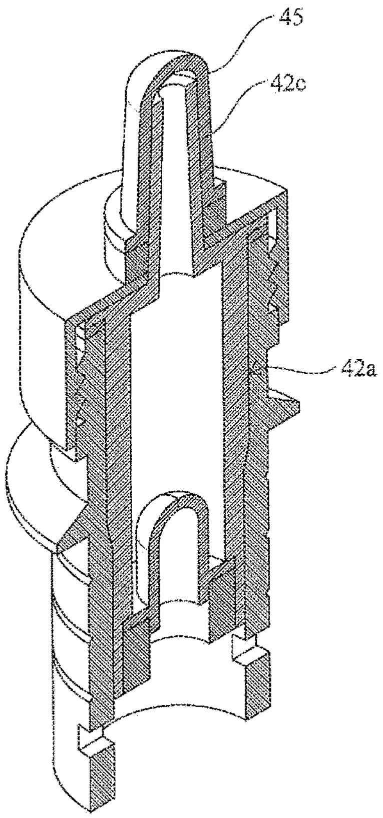
FIG. 43 is an exploded cross sectional view of a state where the cap is assembled to a nozzle portion of the holding mechanism of the check valve.
Figure 44:
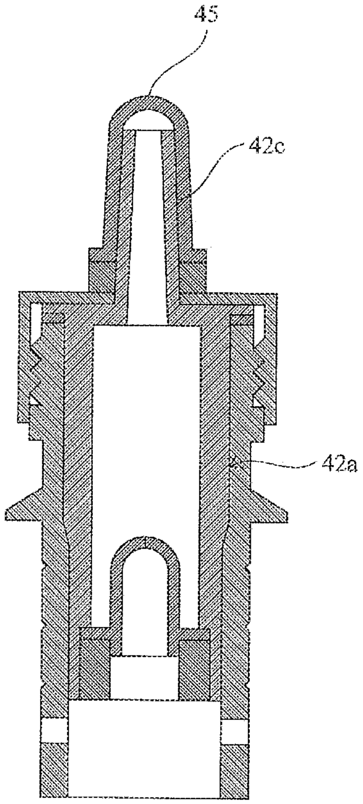
FIG. 44 is a central cut perspective view.

Moreover, as shown in FIG. 42 from the state shown in FIG. 41, the holding mechanism 42 of the check valve is stored in the tubular body 43 and then the lid body 44 is attached; and as shown in FIGS. 43 and 44, the cap 45 is assembled to the deaeration nozzle 42*c* of the holding mechanism 42 of the check valve.

FIGS. 45 to 58 show the pouring nozzle opening and closing mechanism 51 to be attached to the lower end of the suspension container 31.

Figure 45:
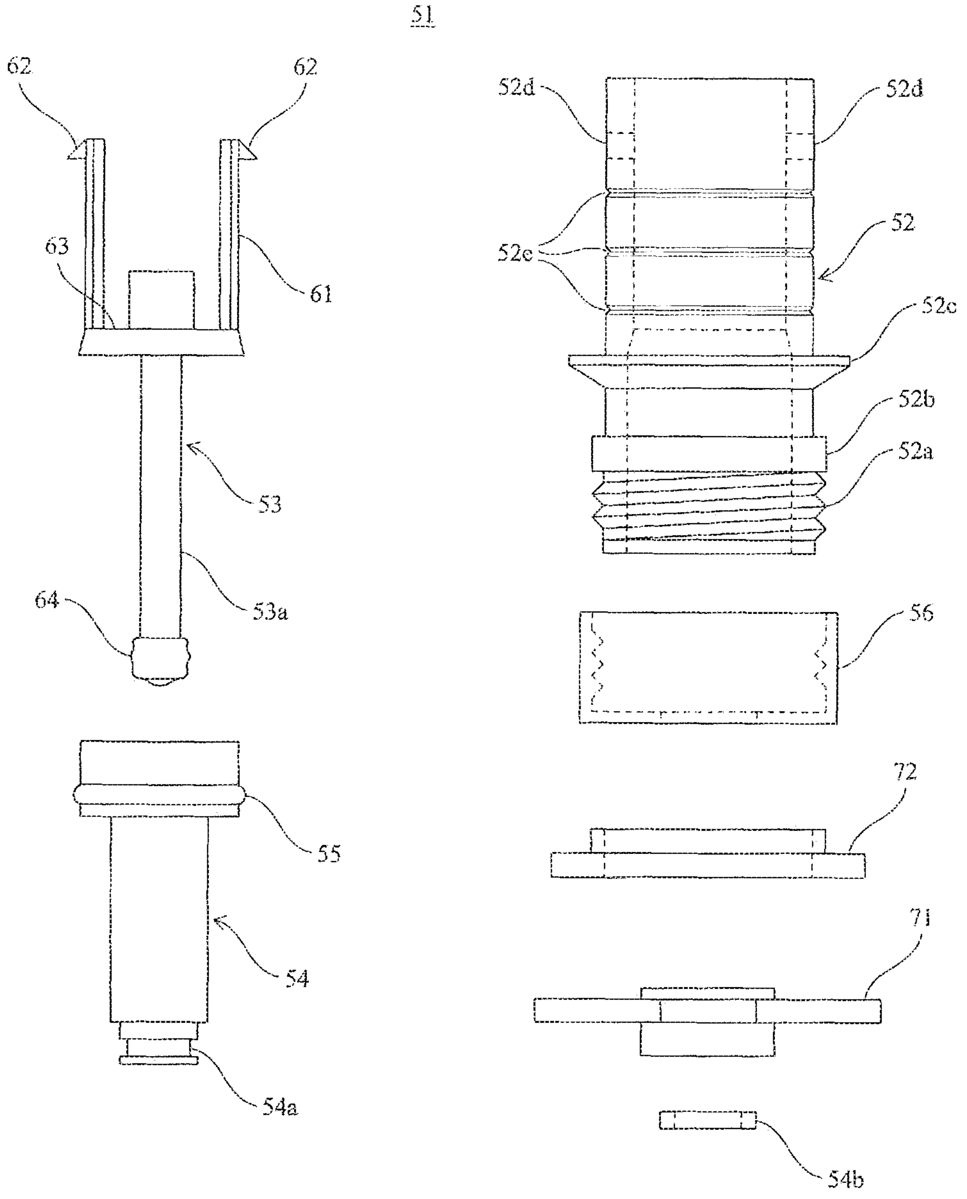
FIG. 45 is a perspective view showing each part of the pouring nozzle opening and closing mechanism of the suspension container in a disassembled state.
Figure 46:
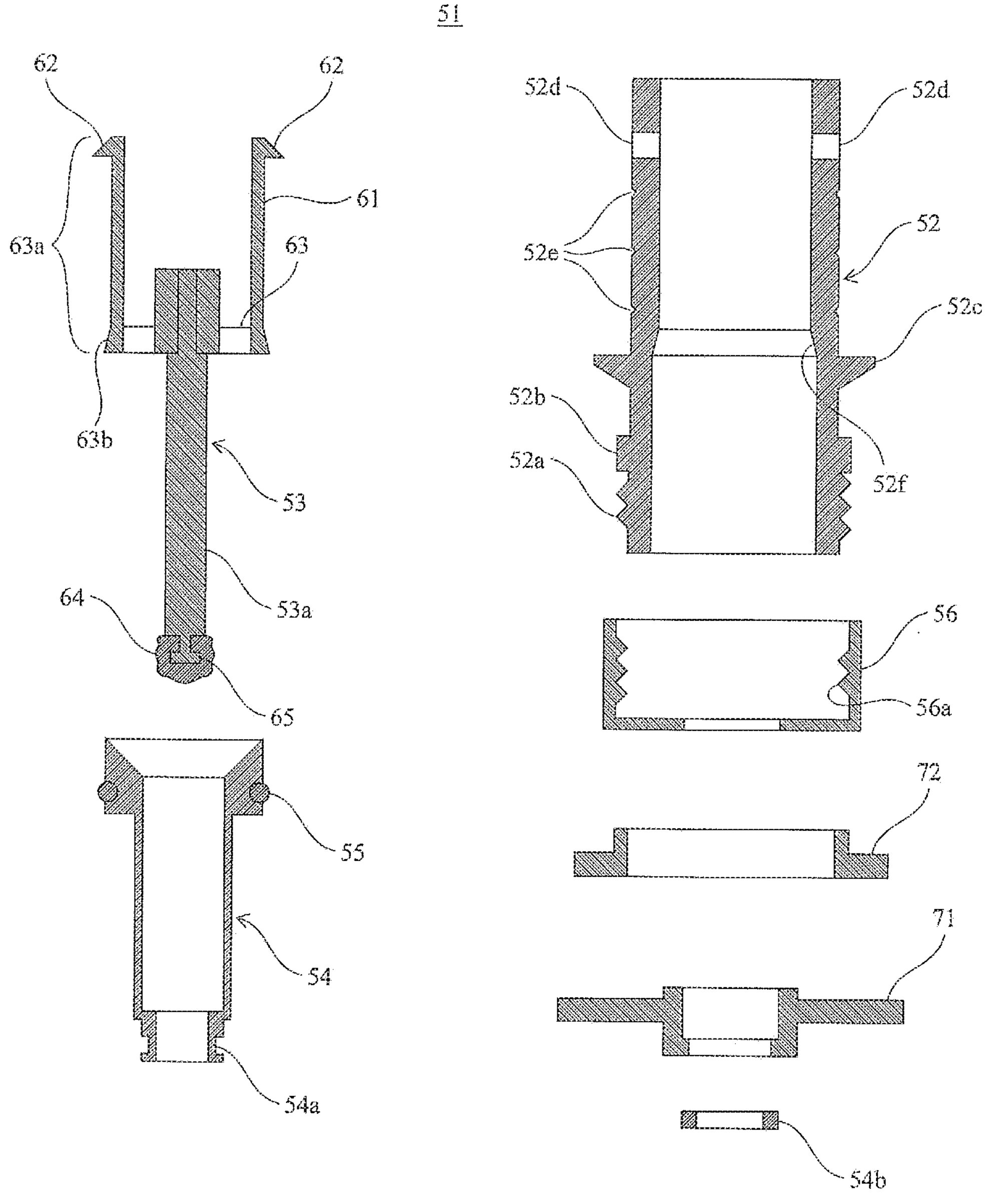
FIG. 46 is a cross sectional view showing the above disassembled state.
Figure 47A:
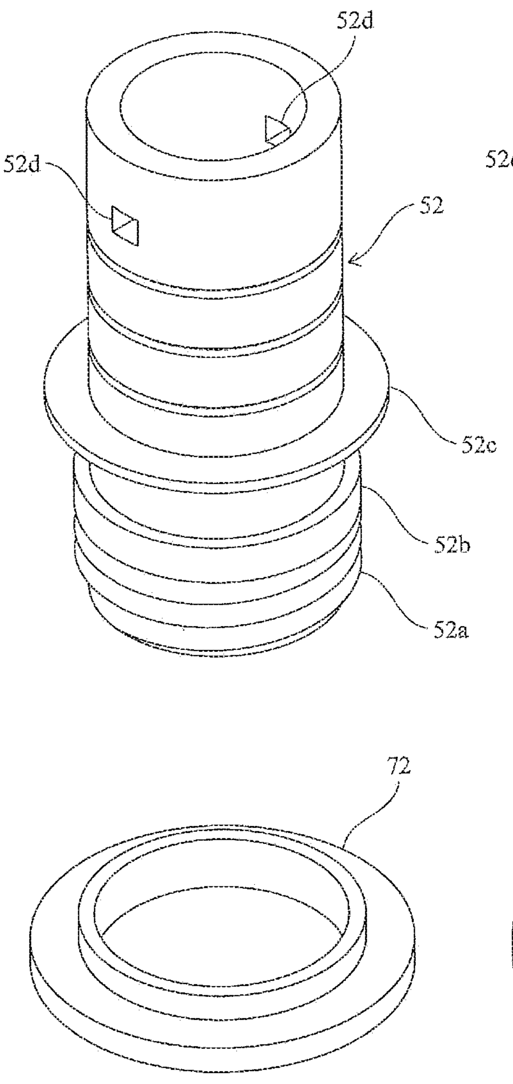
FIG. 47(*a*) is an exploded perspective view showing a tubular housing and an upper operation lever body configuring the pouring nozzle opening and closing mechanism.
Figure 47B:
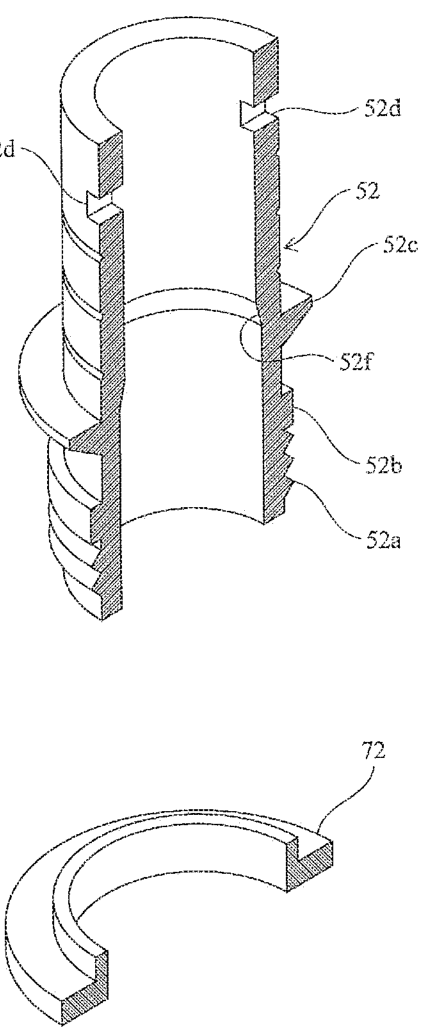

As shown in FIGS. 45 and 46, a tubular housing 52 is formed with circumferential grooves 52*e* at a predetermined interval along a length direction on the outer circumference, and the circumferential grooves 52*e* are used for more firmly joining to the suspension container 31 by welding.

An outer screw 52*a* is formed at a lower end of the tubular housing 52, and a lid body 56 is attached by an inner screw portion 56*a* provided on the lid body 56. In addition, on the outer circumference of the tubular housing 52, a ring-shaped flange portion 52*c* is formed at a predetermined interval from a ring-shaped frame portion 52*b* at an end portion of the outer screw 52*a*.

In the figures, 52*d*, 52*d* denote a plurality of engagement holes provided in an inner wall of the tubular housing 52.

A closing plug 53 is detachably attached in the tubular housing 52.

As shown in FIGS. 45 to 48, the closing plug 53 includes: engagement arms 63*a* each including a longitudinal arm portion 61 in which projections 62 engaging with the plurality of engagement holes 52*d*, 52*d* formed in the inner wall of the tubular housing 52 are provided at the upper end and a lateral arm portion 63 whose lower ends are connected at predetermined intervals; a closing plug body 53*a* fixed downward to the lateral arm portion 63; and a closing packing 64 attached to an end portion of the closing plug body 53*a*. The closing packing 64 is attached to enclose around an inflated head portion 65 provided at a distal end of the closing plug 53.

Figure 48A:
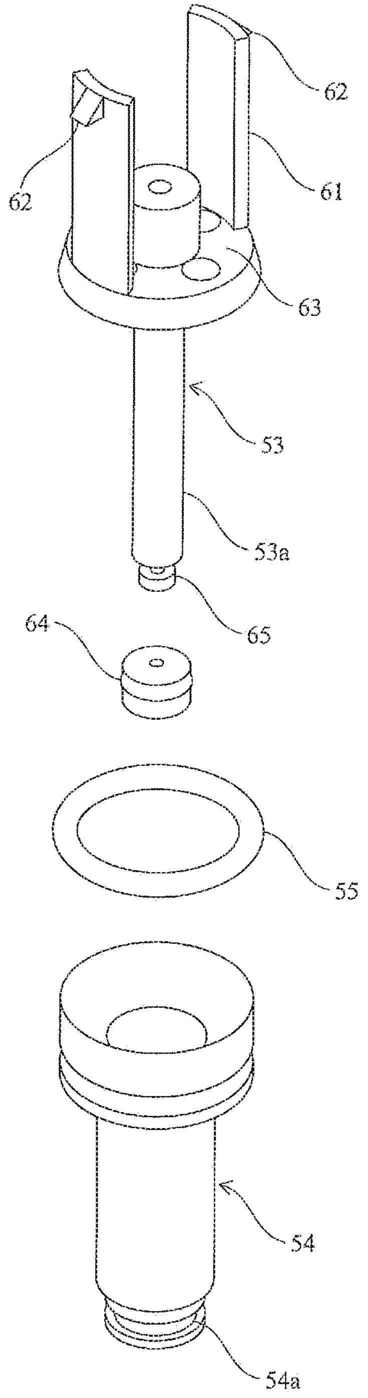
FIG. 48(*a*) is an exploded perspective view showing a closing plug and a tubular slide body.
Figure 48B:
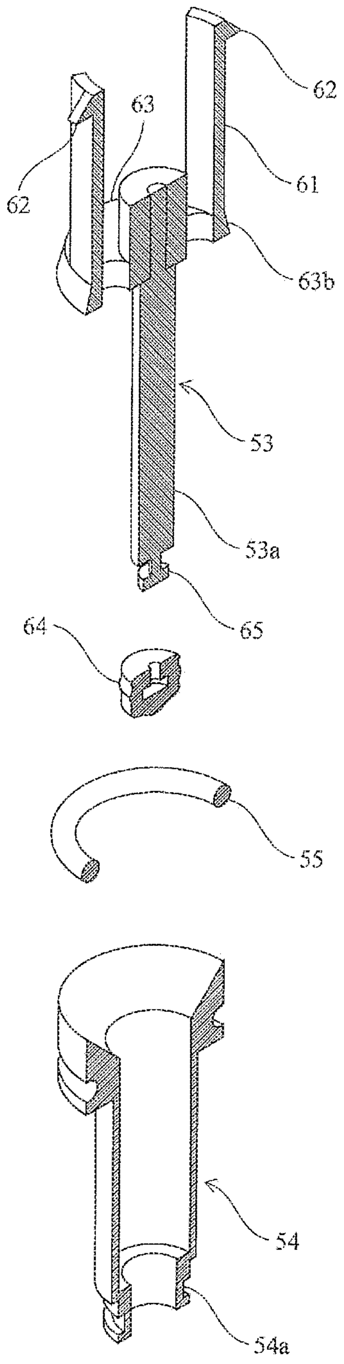

A tubular slide body 54 is attached to the tubular housing 52 so as to enclose at least a lower portion of the closing plug 53 along an inner circumferential surface of the lower end of the tubular housing 52. As shown in FIG. 48, the tubular slide body 54 is held to slide up and down in the tubular housing 52 via a sliding packing 55.

Figure 49A:
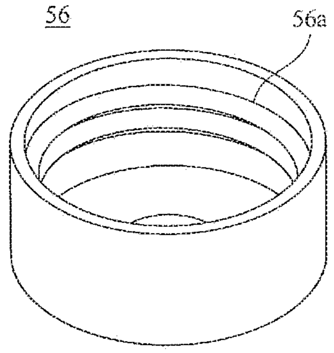
FIG. 49(*a*) is an exploded perspective view showing the lid body.
Figure 49B:
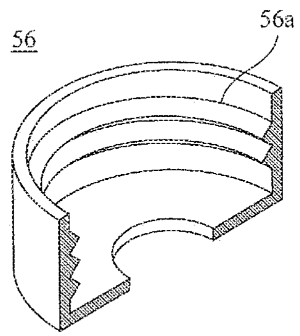

The lid body 56 shown in FIG. 49 is attached to the outer screw 52*a* of the tubular housing 52 via the inner screw portion 56*a*.

Figure 54:
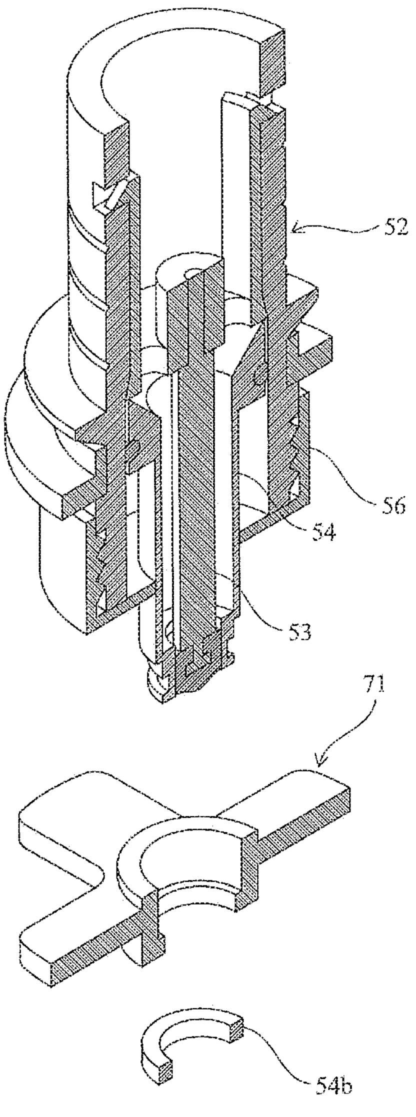
FIG. 54 is a central cut perspective view showing a stage of further assembling the operation lever.

As shown in FIG. 54, the closing plug 53 has the lower end thereof protruding from the lid body 56 attached to the tubular housing 52.

Figure 50A:
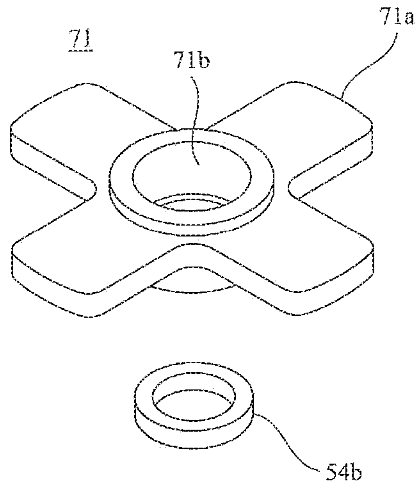
FIG. 50(*a*) is an exploded perspective view showing an operation lever.
Figure 50B:
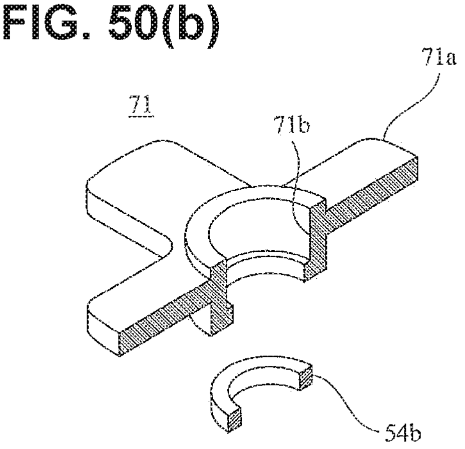

As shown in FIG. 50, an operation lever 71 having petal-like engagement portions 71*a* horizontally extended is attached to a lower end of the tubular slide body 54. The operation lever 71 includes an attachment hole 71*b* at a center thereof for attachment by passing through the lower end of the tubular slide body 54. The attachment hole 71*b* is passed through the lower end of the tubular slide body 54, and then a stopper packing 54*b* is attached to a circumferential groove 54*a* provided at the lower end of the tubular slide body 54. Therefore, the operation lever 71 can be prevented from detaching from the tubular slide body 54.

As shown in FIGS. 45 and 46, an upper operation lever body 72 is interposed between the tubular housing 52 and the flange portion 52*b* projecting from the outer circumference of the tubular housing 52 so as to form a predetermined interval between the outer screw 52*a* and the lid body 56 attached to the outer screw 52*a*. The upper operation lever body 72 can be mounted in the above position by enlarging a diameter by a cut (not shown) or the like.

The upper operation lever body 72 makes it easier for the operation lever 71 to perform a return operation by pinching the operation lever 71 of the tubular housing 52 with a finger or the like.

Figure 51:
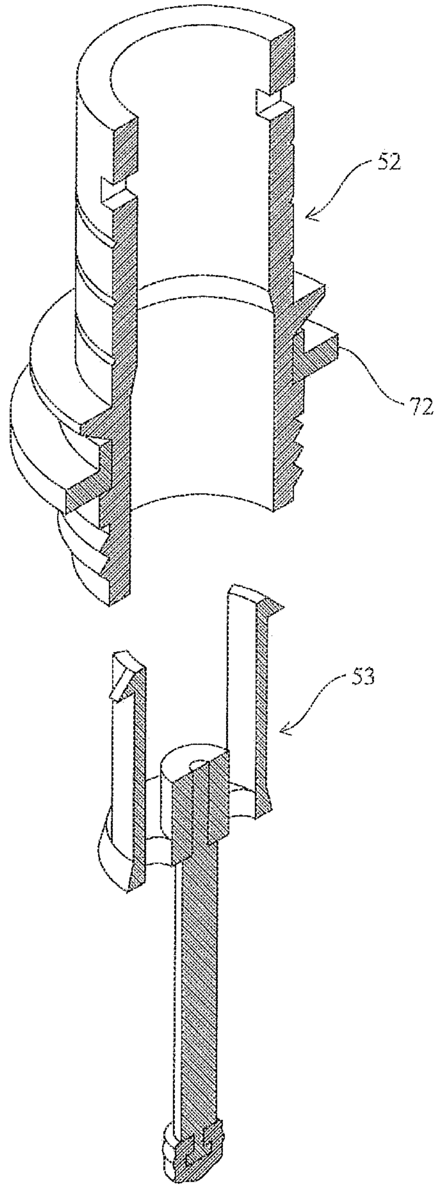
FIG. 51 is a central cut perspective view showing a stage of assembling the closing plug to the tubular housing.
Figure 52:
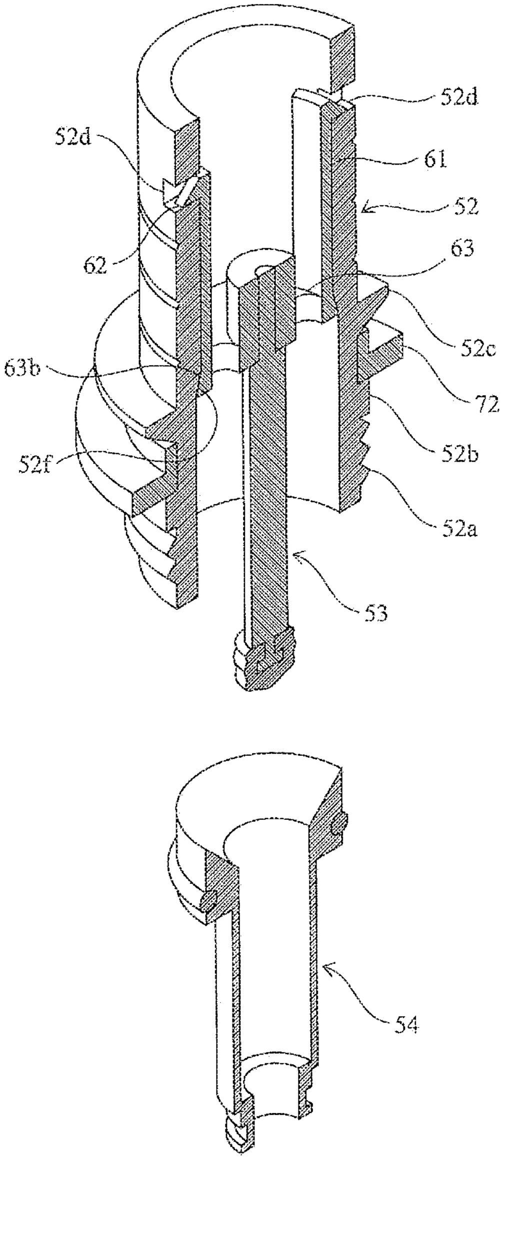
FIG. 52 is a central cut perspective view showing a stage of assembling the closing plug to the tubular housing and further assembling the tubular slide body.

During assembling of each part, as shown in FIG. 52 from the state shown in FIG. 51, the closing plug 53 is pushed in from the lower side of the tubular housing 52.

Accordingly, the closing plug 53 has the plurality of engagement holes 52*d*, 52*d* provided on the inner wall of the tubular housing 52 and the protrusions 62 provided outward engaging with an upper end of the longitudinal arm portion 61. At this time, a protruding portion 63*b* provided on an outer circumference of the lateral arm portion 63 is engaged with a step 52*f* provided on the inner wall of the tubular housing 52 at a predetermined height and will not be pushed in further.

Figure 53:
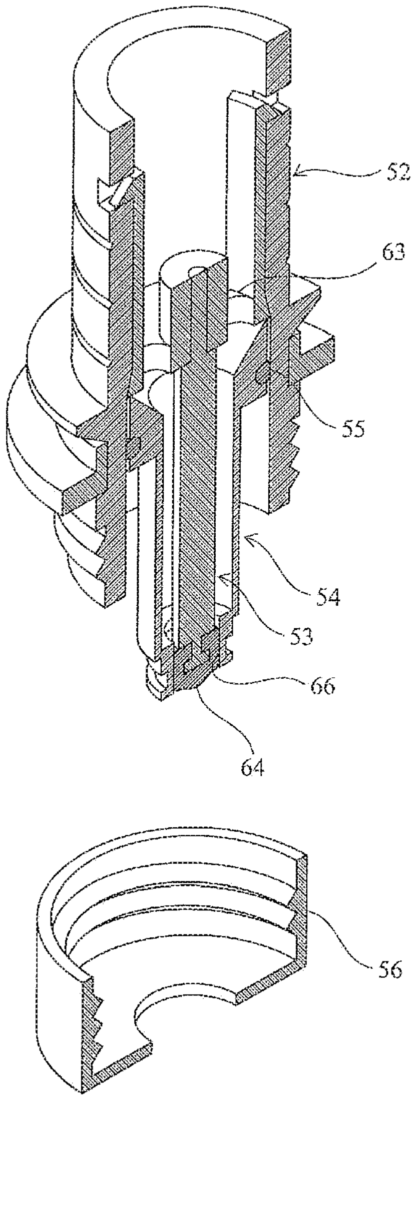
FIG. 53 is a central cut perspective view showing a stage of further assembling the lid.

Next, as shown in FIG. 53 from the state shown in FIG. 52, the tubular slide body 54 is pushed in from the lower side of the tubular housing 52.

At this time, the tubular slide body 54 slides upward in the tubular housing 52 via the sliding packing 55, is pushed to a position of the lateral arm portion 63 of the closing plug 53, and thereby is held to enclose an outer side of the closing plug 53 at a predetermined interval. At the same time, a tubular closing portion 66 at the lower end of the tubular slide body 54 is engaged with a closing packing 64 of the closing plug 53.

Next, as shown in FIG. 54 from the state shown in FIG. 53, when the lid body 56 is screwed in from the lower side of the tubular housing 52, the downward slide position of the tubular slide body 54 is restricted by the lid body 56.

Figure 55:
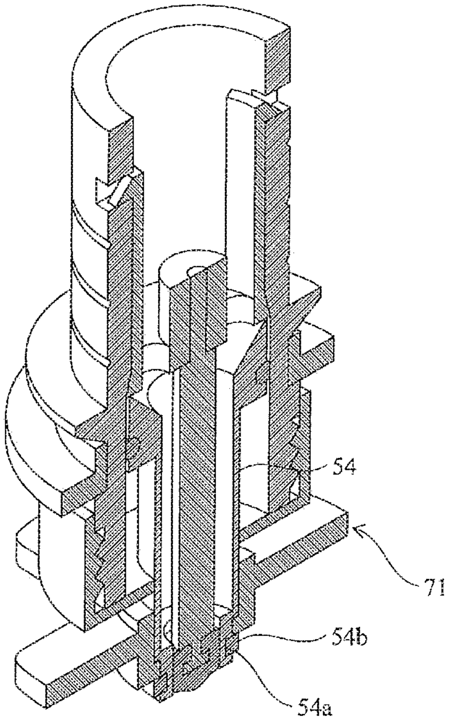
FIG. 55 is a central cut perspective view at the time of completion of the assembly.
Figure 56:
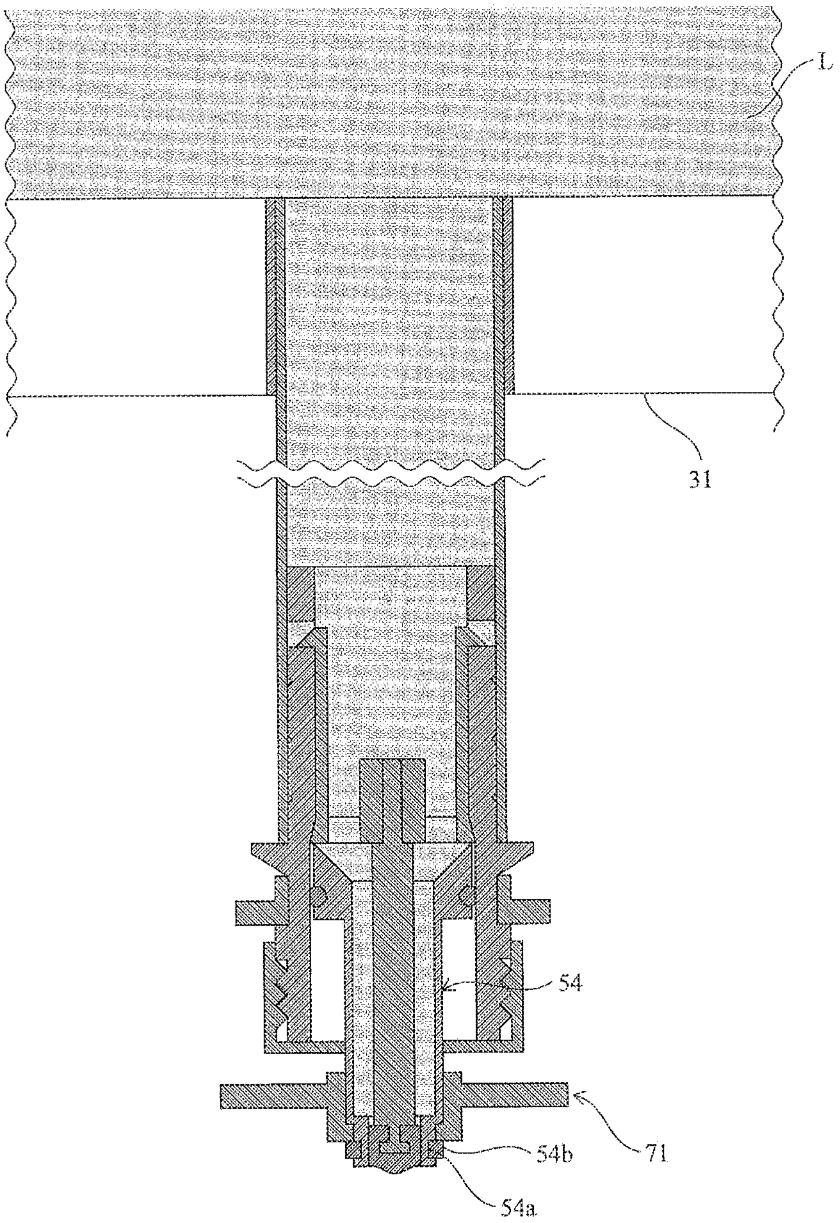
FIG. 56 is a cross sectional view showing the above state.

Moreover, as shown in FIGS. 55 and 56 from the state shown in FIG. 54, when the operation lever 71 is pushed into the lower end of the tubular slide body 54 and the stopper packing 54*b* is attached to the circumferential groove 54*a* provided at the lower end of the tubular slide body 54, the operation lever 71 is reliably attached to the tubular slide body 54.

Figure 57:
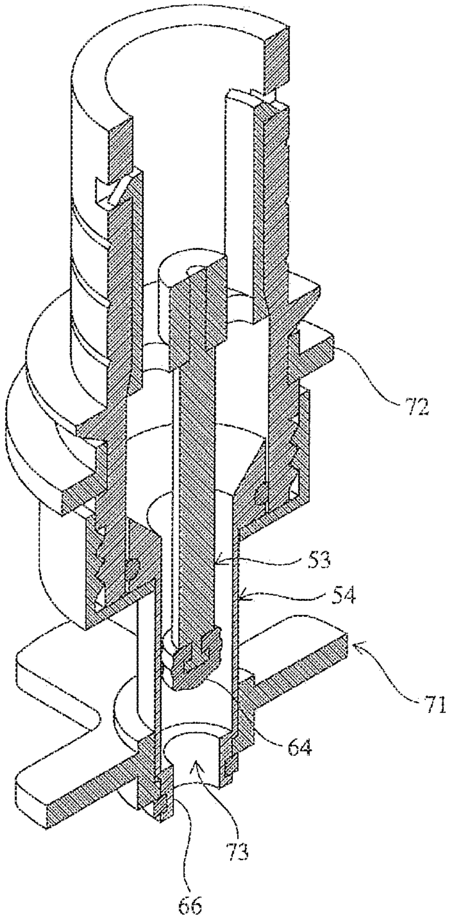
FIG. 57 is a central cut perspective view in a state where the operation lever is pulled down.
Figure 58:
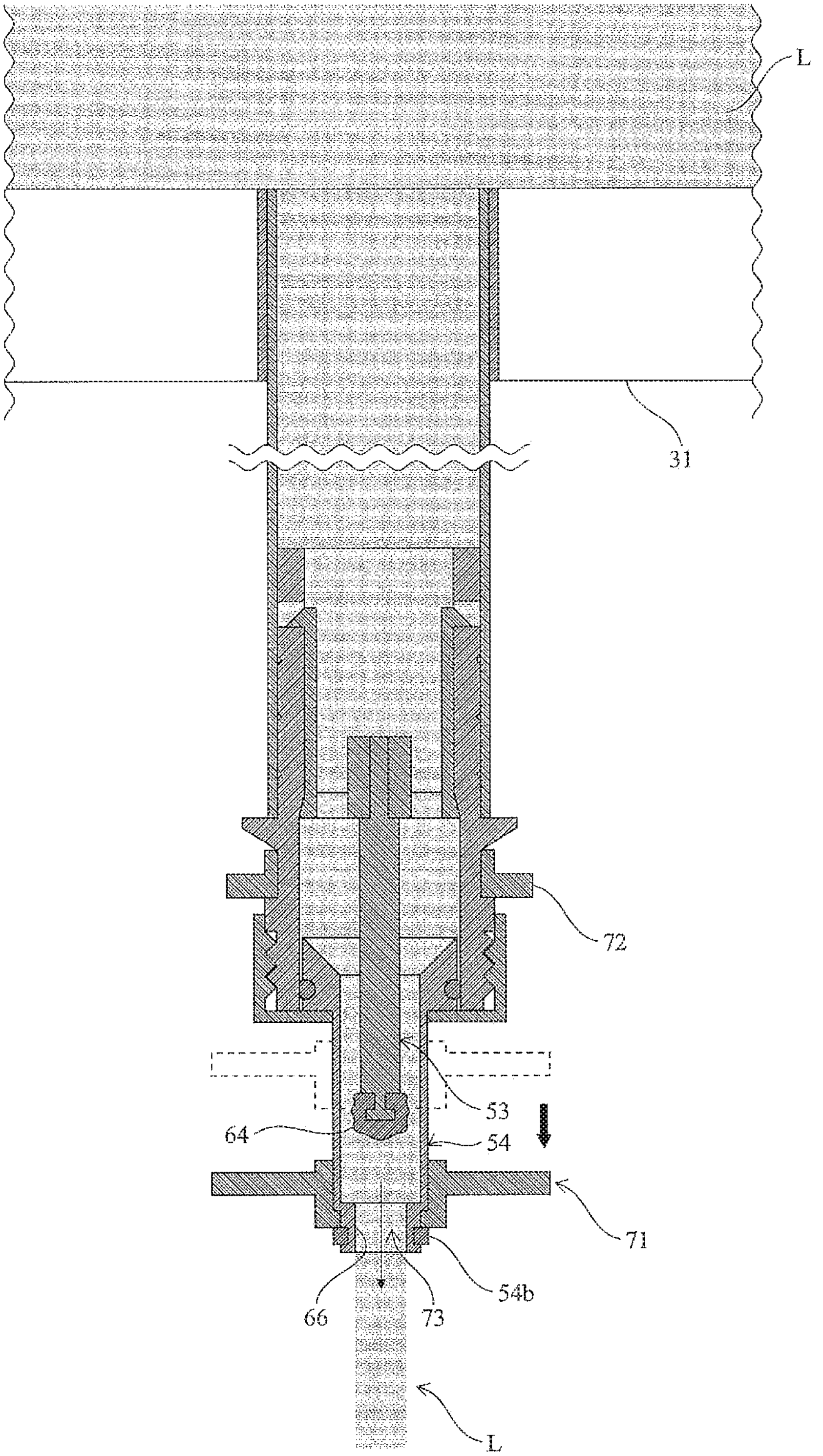
FIG. 58 is a cross sectional view showing the above state.

According to the pouring nozzle opening and closing mechanism 51 of the present invention, it is of course that an opening state of a pouring nozzle 73 can be easily held merely by pulling down the operation lever 71, as shown in FIGS. 57 and 58; and a closed state thereof can be easily held merely by pushing up the operation lever 71 by pushing the upper operation lever body 72 with a finger and engaging the closing portion 66 with the closing packing 64 of the closing plug 53. Therefore, pouring of the liquid content can be controlled by a very simple operation.

That is, when the tubular slide body 54 is at an upper end position, the closing portion 66 is engaged with the closing packing 64 of the closing plug 53 to be closed; and when the tubular slide body 54 is at a lower position by the downward operation of the operation lever 71, the engagement between the closing portion 66 and the closing packing 64 of the closing plug 53 is released and the tubular slide body 54 is opened to enter a pouring state.

INDUSTRIAL APPLICABILITY

According to the present invention, the bag-in box can be used, for example, as a commercial transport container known as an example of so-called bag-in box, for various foods (e.g., dairy products, seasoning liquids, alcoholic beverages, edible oils, soft drinks and fruits), chemicals (e.g., photographic processing agents, surfactants, metal treating agents and floor wax), toiletries (e.g., shampoos, rinses, and liquid detergents), or the like.

Of course, the bag-in box of the present invention can be used for applications other than the above purposes and can be used for storing contents of less than or equal to 10 liters in addition to contents mainly of 18 liters to 20 liters.

DESCRIPTION OF REFERENCE NUMERALS

11 Storage box
12 Base
12*a* Base plate
12*b* Support plate
12*c* Side plate
12*d* Slope portion
13 Wide side plate
14 Narrow side plate
15 Wide bottom plate
16 Narrow bottom plate
17 Wide top plate
18 Narrow top plate
19 Fold
20 Connecting piece
21 Through hole
22 Suspension unit
31 Suspension container
31*a* Plastic sheet
41 Opening and closing plug
42 Holding mechanism of check valve
42*a* Tubular holding portion
42*b* Flange portion
42*c* Deaeration nozzle
42*d* Step
42*e* Check valve
42*f* Tubular elastic body
42*g* Packing
43 Tubular body
43*a* Circumferential groove
43*b* Flange portion
43*c* Outer screw
44 Lid body
44*a* Inner screw
44*b* Through hole
44*c* Packing
45 Cap
51 Pouring nozzle opening and closing mechanism
52 Tubular housing
52*a* Outer screw
52*c* Flange portion
52*d*, 52*d* Engagement hole
52*e* Circumferential groove
52*f* Step
53 Closing plug
53*a* Closing plug body
54 Tubular slide body
54*a* Circumferential groove
54*b* Stopper packing
55 Sliding packing
56 Lid body
56*a* Inner screw portion
61 Longitudinal arm portion
62 Protrusion
63 Lateral arm portion
63*a* Engagement arm
63*b* Protruding portion
64 Closing packing
65 Inflated head portion
66 Closing portion
71 Operation lever
71*a* Engagement portion
71*b* Attachment hole
72 Upper operation lever body
73 Pouring nozzle
81 Display shelf
A Air
L Liquid content

The invention claimed is:

1. A bag-in box which is to be used by drawing out a pouring nozzle opening and closing mechanism attached to a lower end of a suspension container from a through hole, the bag-in box comprising:

a storage box which is provided with the through hole of the pouring nozzle opening and closing mechanism at a lower end of a side wall; and the suspension container which is made of a film material and is suspended in the storage box, the pouring nozzle opening and closing mechanism of the suspension container being foldable at the lower end of the side wall of the storage box at the through hole, wherein a bottom portion of the storage box is provided with a base for holding the suspension container inclined toward the through hole, and a base plate configuring the base is configured to include a horizontal portion and a slope portion arranged in sequence to hold the suspension container to be inclined toward the through hole, the horizontal portion being supported to be horizontal with side plates on both sides toward the through hole, the side plates being folded downward, the slope portion being folded obliquely downwards from an edge of the horizontal portion toward the through hole, and the slope portion not being supported by side plates, an upper portion of the storage box is provided with a suspension unit for suspending and holding an opening and closing plug provided at an upper portion of the suspension container, when filling a liquid content, the opening and closing plug of the suspension container is opened, and when pouring the liquid content, the opening and closing plug provided at the upper portion of the suspension container is suspended and held by the suspension unit and the opening and closing plug is closed, and in the storage box, the pouring nozzle opening and closing mechanism attached to the lower end of the suspension container is drawn out from the through hole, so that the liquid content is pourable by opening of the pouring nozzle opening and closing mechanism.

2. The bag-in box according to claim 1, wherein the opening and closing plug provided at the upper portion of the suspension container includes a check valve therein, when filling the liquid content, the opening and closing plug of the suspension container is opened to fill the suspension container with the liquid content, and then the opening and closing plug is closed to discharge air in the suspension container from the check valve to fill the suspension container with only the liquid content, the suspension container is fitted in the storage box to draw out the pouring nozzle opening and closing mechanism at the lower end of the suspension container from the through hole, and the opening and closing plug provided at the upper portion of the suspension container is suspended and held by the suspension unit.

3. The bag-in box according to claim 1, the bag-in box which is to be used by drawing out the pouring nozzle opening and closing mechanism attached to the lower end of the suspension container from the through hole including: the storage box which is provided with the through hole of the pouring nozzle opening and closing mechanism at the lower end of the side wall; and the suspension container which is made of the film material and is suspended in the storage box, wherein the bottom portion of the storage box is provided with the base for holding the suspension container above the through hole, and the base is formed with the slope portion sloping downward toward the through hole of the pouring nozzle opening and closing mechanism.

4. The bag-in box according to claim 1, wherein storage boxes provided with the through hole of the pouring nozzle opening and closing mechanism at the lower end of the side wall are displayable side by side on a commodity display shelf by narrowing a width of the through hole forming a side wall surface to be smaller than a width of the other side wall surface orthogonal thereto.

* * * * *